United States Patent
Matayoshi et al.

(10) Patent No.: US 6,253,728 B1
(45) Date of Patent: *Jul. 3, 2001

(54) DIRECT INJECTION GASOLINE ENGINE WITH STRATIFIED CHARGE COMBUSTION AND HOMOGENEOUS CHARGE COMBUSTION

(75) Inventors: Yutaka Matayoshi; Nobuhisa Jingu, both of Kanagawa; Tadashi Nomura, Yokohama; Tsuyoshi Masuda, Kanagawa, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/576,257

(22) Filed: May 24, 2000

Related U.S. Application Data

(63) Continuation of application No. 09/081,071, filed on May 19, 1998, now Pat. No. 6,092,501.

(30) Foreign Application Priority Data

| May 20, 1997 | (JP) | 9-129053 |
| May 23, 1997 | (JP) | 9-132673 |
| May 26, 1997 | (JP) | 9-135269 |
| May 28, 1997 | (JP) | 9-137369 |

(51) Int. Cl.$^7$ ................................ F02B 31/00
(52) U.S. Cl. ................ 123/301; 123/276; 123/305
(58) Field of Search ................ 123/262, 263, 123/276, 279, 295, 301, 305, 308

(56) References Cited

U.S. PATENT DOCUMENTS

| 5,115,774 | 5/1992 | Nomura et al. | 123/302 |
| 5,140,958 | 8/1992 | Kobayashi et al. | 123/276 |
| 5,553,588 | 9/1996 | Gono et al. | 123/276 |
| 5,709,190 | 1/1998 | Suzuki | 123/302 |
| 5,711,269 | 1/1998 | Oda et al. | 123/262 |
| 5,720,253 | 2/1998 | Matoba et al. | 123/301 |
| 5,806,482 | 9/1998 | Igarashi et al. | 123/305 |
| 5,816,215 | 10/1998 | Yoshikawa et al. | 123/305 |
| 5,979,399 | * 11/1999 | Piock et al. | 123/305 |
| 6,092,501 | * 7/2000 | Matayoshi et al. | 123/301 |

FOREIGN PATENT DOCUMENTS

| 412 008 | 2/1991 | (EP) . |
| 0 464 594 | 1/1992 | (EP) . |
| 0 492 055 | 7/1992 | (EP) . |
| 0 496 029 | 7/1992 | (EP) . |
| 57-198306 | 12/1982 | (JP) . |
| 6-185321 | 7/1994 | (JP) . |
| 8-35429 | 2/1996 | (JP) . |
| 8312354 | 11/1996 | (JP) . |

OTHER PUBLICATIONS

Press Information, "Nissan Direct–Injection Engine", Document E1–2200–9709, Nissan Motor Co., Ltd. pp. 2–19 Sep. 18, 1997.
Patent Abstracts of Japan, vol. 097, No. 003, Mar. 31, 1997.
Patent Abstracts of Japan, vol. 014, No. 395, Aug. 27, 1990.
Patent Abstracts of Japan, vol 097, No. 007, Jul. 31, 1997.

* cited by examiner

Primary Examiner—John Kwon
(74) Attorney, Agent, or Firm—Foley & Lardner

(57) ABSTRACT

An internal combustion gasoline engine has an air intake assembly which injects air through the cylinder head into the cylinder to generate swirl (horizontal vortex) flow (as opposed to tumble (vertical vortex) flow) for stratified charge combustion, and to generate tumble flow for homogeneous charge combustion. The piston includes a cavity combustion chamber at the top surface of the piston, the cavity combustion chamber having an increasing cross sectional area as the top of the piston is approached.

21 Claims, 30 Drawing Sheets

DIRECT INJECTION GASOLINE ENGINE WITH STRATIFIED CHARGE COMBUSTION AND HOMOGENEOUS CHARGE COMBUSTION

This application is a continuation of application Ser. No. 09/081,071, filed May 19, 1998 now U.S. Pat. No. 6,092, 501. The entire contents of this Ser. No. 09/081,071 application are incorporated herein by reference.

BACKGROUND

The invention relates to a direct injection type internal combustion gasoline engine and particularly to improvements in direct injection type internal combustion engines which employ both homogeneous charge combustion and stratified charge combustion.

A conventional engine injects gasoline into the air intake port upstream of the combustion chamber. The air-fuel mixture is then transported to the combustion chamber where it is burned. In contrast to this arrangement, a direct injection gasoline engine has the fuel injector located inside the combustion chamber so that the fuel is injected directly into the cylinder.

The combustion process of a conventional gasoline engine is limited to homogeneous charge combustion. A direct injection gasoline engine, on the other hand, selectively uses both stratified charge combustion and homogeneous charge combustion.

With stratified charge combustion, the fuel is injected into the combustion chamber during the compression stroke. The objective is to position a readily ignitable mixture in the vicinity of the spark plug while forming a surrounding air layer that contains little fuel. This process thus accomplishes stable combustion of an overall lean mixture. Lean combustion is accomplished in the stratified charge combustion process to improve fuel economy.

With homogeneous charge combustion, on the other hand, the fuel is injected into the combustion chamber in the induction stroke. Similar to a conventional gasoline engine, the mixture is then uniformly mixed to a stoichiometric ratio. This results in the generation of greater power under high-load operation.

In short, a direct injection gasoline engine employs stratified charge combustion at low load for improved fuel economy and homogeneous charge combustion at high load for greater power. This selective use of the two combustion processes achieves both low fuel consumption and high power output.

A variety of direct injection type internal combustion engines have been proposed.

One of two different physical phenomenons may be employed during stratified charge combustion. These phenomenons differ with respect to how air flows in the cylinder during stratified charge combustion. One type is "tumble" flow wherein a vortex is created in a vertical plane of the cylinder. Such flow is shown, for example, in U.S. Pat. No. 5,711,269 issued to Hideyuki Oda and others. The other type is "swirl" flow wherein a vortex is created in a horizontal plane of the cylinder during stratified charge combustion.

This invention employs swirl (that is, horizontal vortex) flow during stratified charge combustion.

A direct injection type internal combustion engine employing swirl flow during stratified charge combustion is described, for example, in U.S. Pat. No. 5,553,588 issued to Takeshi Gono and others. The internal combustion engine described in this patent is arranged as follows. A non-circular cavity combustion chamber which is eccentric relative to a piston outer peripheral circle is formed at the top section of the piston. A fuel injector valve is disposed to inject fuel toward the cavity combustion chamber near the upper dead center of the piston. The cavity combustion chamber is a reentrant type so as to confine fuel and swirl therein. In other words, the cross-sectional area of the combustion chamber is reduced toward the top of the piston. In order to produce strong swirl in this cavity combustion chamber, one of a pair of intake ports is arranged as a helical port, and an air control valve is provided to open or close the other intake port.

The internal combustion engine in this patent is arranged such that, during lean combustion, the above-mentioned air control valve is closed so that fresh air is introduced only through the one helical port to produce strong swirl inside the cylinder. Since this swirl is introduced into the cavity combustion chamber with ascent of the piston, a combustible air-fuel mixture is formed and carried to near the spark plug by injecting fuel into the cavity combustion chamber near the top dead center of compression. Accordingly, ignited combustion can be accomplished by making ignition at a suitable timing.

However, the inventors of this invention have recognized several shortcomings of this arrangement. In the above-mentioned arrangement of the piston, the cavity combustion chamber at the piston top section is non-circular, such as generally triangle-shaped or cocoon-shaped, and therefore a very strong swirl must be produced in the cylinder by using a helical port in order to create swirl having a sufficient intensity.

However, using such a helical port increases intake air resistance at high power output under the high load operation. To compensate for this reduced output, a variable valve timing system is provided, which complicates construction and increases cost.

Additionally, by forming the cavity combustion chamber in a reentrant shape, swirl and the air-fuel mixture is maintained inside the cavity combustion chamber during stratified charge combustion. However, fuel tends to stagnate in such a cavity combustion chamber during homogeneous charge combustion, thereby degrading performance. Also, the required depth of the cavity combustion chamber increases the weight of the piston, which in turn increases noise and vibration.

SUMMARY OF THE INVENTION

It is an object of the invention to provide an improved direct injection engine that overcomes the deficiencies in the prior art designs.

Another object of the invention is to provide a direct injection engine, which minimizes noise and vibration, is powerful, has improved combustion efficiency at all loads, has less pumping loss, and is economical to manufacture.

An engine constructed in accordance with the present invention employs stratified charge combustion (during low loads) and homogeneous charge combustion (during high loads). The invention creates swirl flow (that is, a horizontal vortex) during stratified charge combustion. The piston bowl of the invention is shallow and has an increasing cross-sectional area as the top of the piston is approached. This design minimizes the weight of the piston (which minimizes noise and vibration) and improves combustion efficiency by minimizing air-fuel stagnation during homogeneous charge combustion. The engine also employs an aerodynamic straight port through the side of the cylinder head. This design improves air induction efficiency and power and improves ease of manufacture.

BRIEF DESCRIPTION OF THE DRAWINGS

The invention will be described in further detail below with reference to the accompanying drawings, wherein.

DETAILED DESCRIPTION OF PREFERRED EMBODIMENTS

First Embodiment

The invention provides a direct injection type internal combustion engine which can realize stratified charge lean combustion without using a helical port, and make stratified charge lean combustion and homogeneous charge combustion compatible with each other.

FIGS. 1 to 5 illustrate a first embodiment of the invention.

Figure 1:
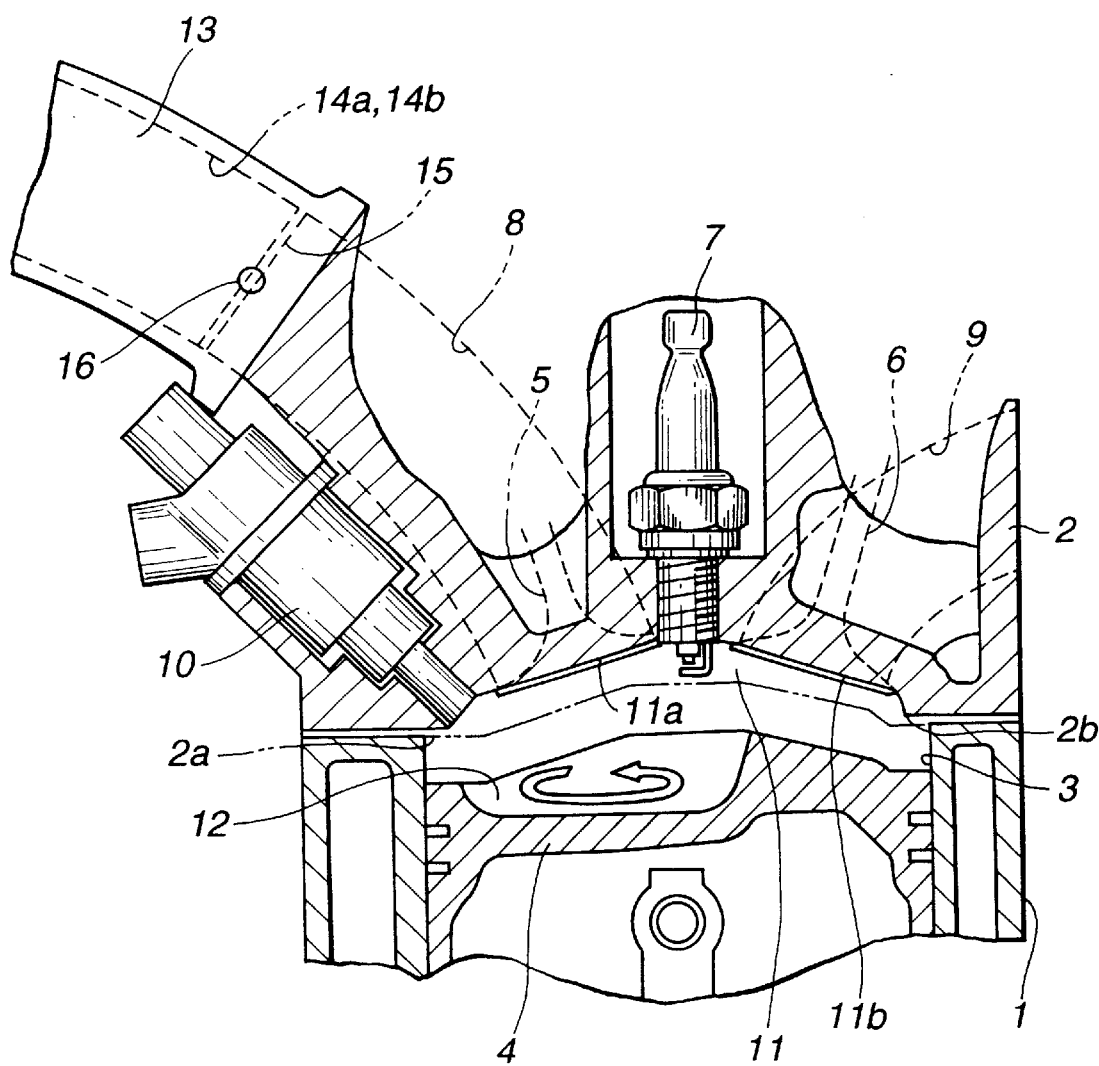
FIG. 1 is a vertical cross-sectional view showing an arrangement of a direct injection type internal combustion gasoline engine according to a first embodiment of the present invention.
Figure 2:
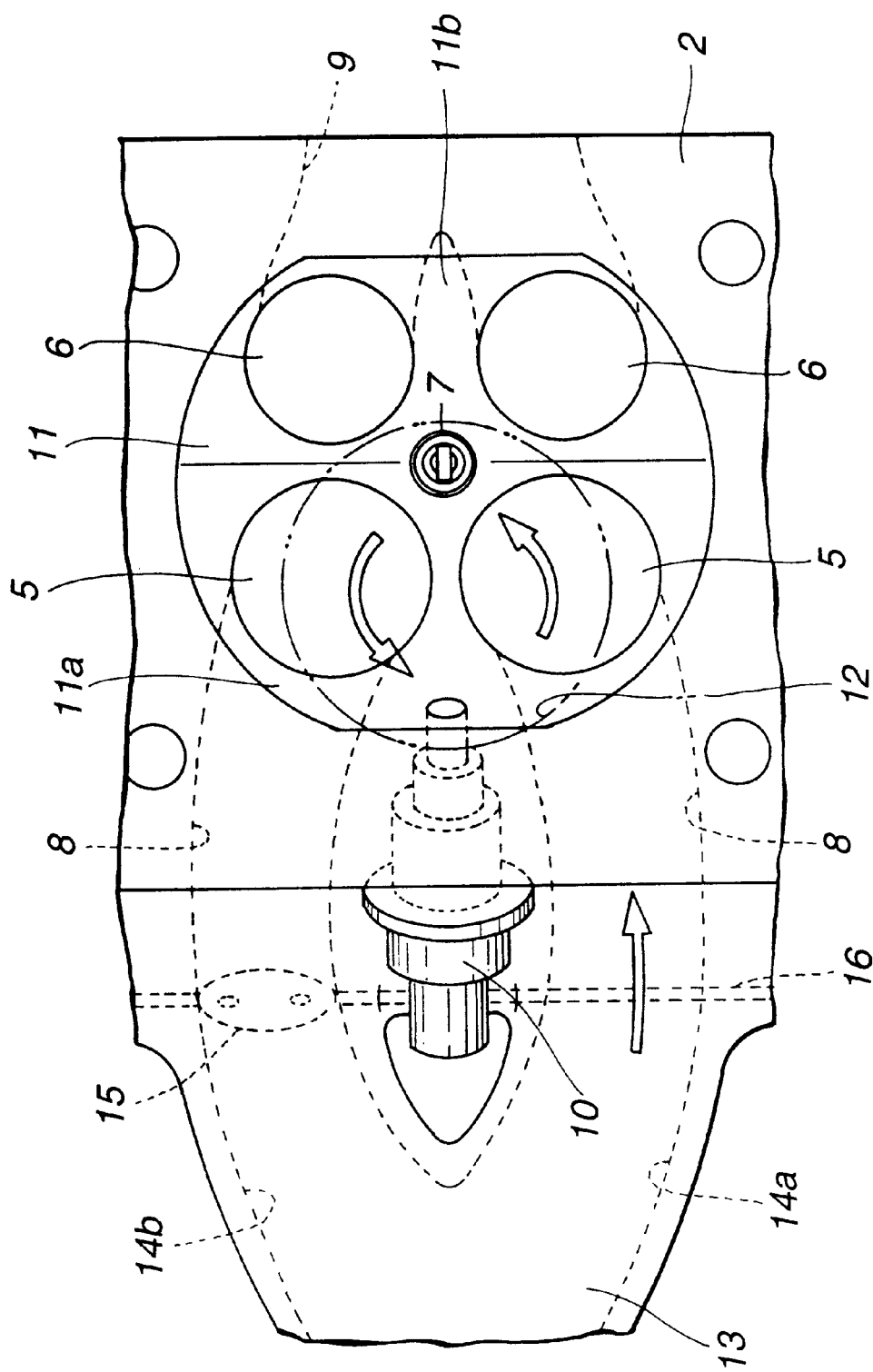
FIG. 2 is a bottom view showing a cylinder head in a state as viewed from a lower surface side.

First, the overall arrangement of a direct injection type internal combustion gasoline engine employing a piston 4 of this invention will be discussed with reference to FIGS. 1 and 2. Then, the design of the piston 4 will be described in detail.

A plurality of cylinders 3 are disposed in line in a cylinder block 1. A cylinder head 2 is fixed to cover the upper surface of the cylinder block 1. A piston 4 is slidably fitted in the cylinder 3. Additionally, a combustion chamber 11 is formed recessed in the cylinder head 2 and is arranged in a so-called pent roof type configuration, in which a pair of intake valves 5 are disposed at one inclined surface 11a of the combustion chamber, while a pair of exhaust valves 6 are disposed at another inclined surface 11b. A spark plug 7 is disposed at the generally central position surrounded by the pair of intake valves 5 and the pair of exhaust valves 6.

The cylinder head 2 is formed with a pair of intake ports 8 which correspond respectively to the pair of intake valves 5 and are formed independent from each other. In other words, the pair of the intake ports 8 are not combined with each other in the cylinder head 2, and pass independently from each other through the side surface of the cylinder head 2. This is called side injection (as opposed to top injection wherein the intake ports pass through the top of the cylinder head). Additionally, exhaust ports 9 are formed corresponding to the exhaust valves 6.

A generally cylindrical electromagnetic fuel injector valve 10 is disposed at the lower surface section of the cylinder head 2. The lower surface section is located adjacent to the side wall of the cylinder 3 at the side of the intake valves 5. The fuel injector valve 10 is installed in a posture wherein its center axis is directed obliquely downward. As shown in FIG. 2, the fuel injector valve 10 is disposed between the two intake valves 5.

A circular cavity combustion chamber 12 is formed at the top section of the piston 4 and is offset toward the intake valves 5. A spray axis of the fuel injector valve 10 is directed to this cavity combustion chamber 12 when the piston is near the top dead center.

The intake ports 8 are respectively connected to a pair of intake passages 14a, 14b which are formed independently at the side of an intake manifold 13. A butterfly-type valve air control valve 15 is disposed in one intake passage 14b so as to open or close the intake passage 14b. This air control valve 15 is controlled to open or close in accordance with the engine operating condition through a shaft 16 by a mechanical driving mechanism (not shown in the Figures).

When the air control valve 15 is closed, fresh air flows in only through the intake port 8 connected with the intake passage 14a. This intake port 8 connected to intake passage 14a is not a helical port, but instead is formed into a gradually curved port shape.

The basic operation of this internal combustion engine will now be described. Homogenous charge combustion upon ignition of a homogenous air-fuel mixture formed inside the cylinder 3 is accomplished at a full load of the engine when the air-fuel ratio is relatively small. During this homogeneous combustion, the air control valve 15 is controlled to be in an opened state so that fresh air is introduced into the cylinder 3 through both intake ports 8. Because of this flow through both intake ports, a strong tumble stream (that is, vertical turbulence or a vertical vortex) is formed inside the cylinder 3. Fuel is injected and supplied into the cylinder 3 during intake stroke. This fuel is positively dispersed inside the cylinder 3 under the action of this tumble stream, and therefore homogenization occurs in the cavity combustion chamber 12.

In the low load operating region, stratified charge combustion is carried out. Adequate ignition is made possible due to stratifioation of the air-fuel mixture. During stratified charge combustion, the air control valve 15 is closed so that fresh air flows into the cylinder 3 through only one intake port 8. Because of this, the tumble component is relatively weak inside the cylinder 3, while a strong swirl stream is formed in a horizontal plane of the cylinder. During stratified charge lean combustion, fuel is injected from the fuel injector valve 10 toward the cavity combustion chamber 12 in the latter half of the compression stroke. This injected fuel moves to the side of the spark plug 7 together with the swirl stream enclosed inside the cavity combustion chamber 12 at the top section of the piston 4 to form an ignitable air-fuel mixture around the spark plug 7. Combustion occurs by ignition at the appropriate time.

Figure 3:
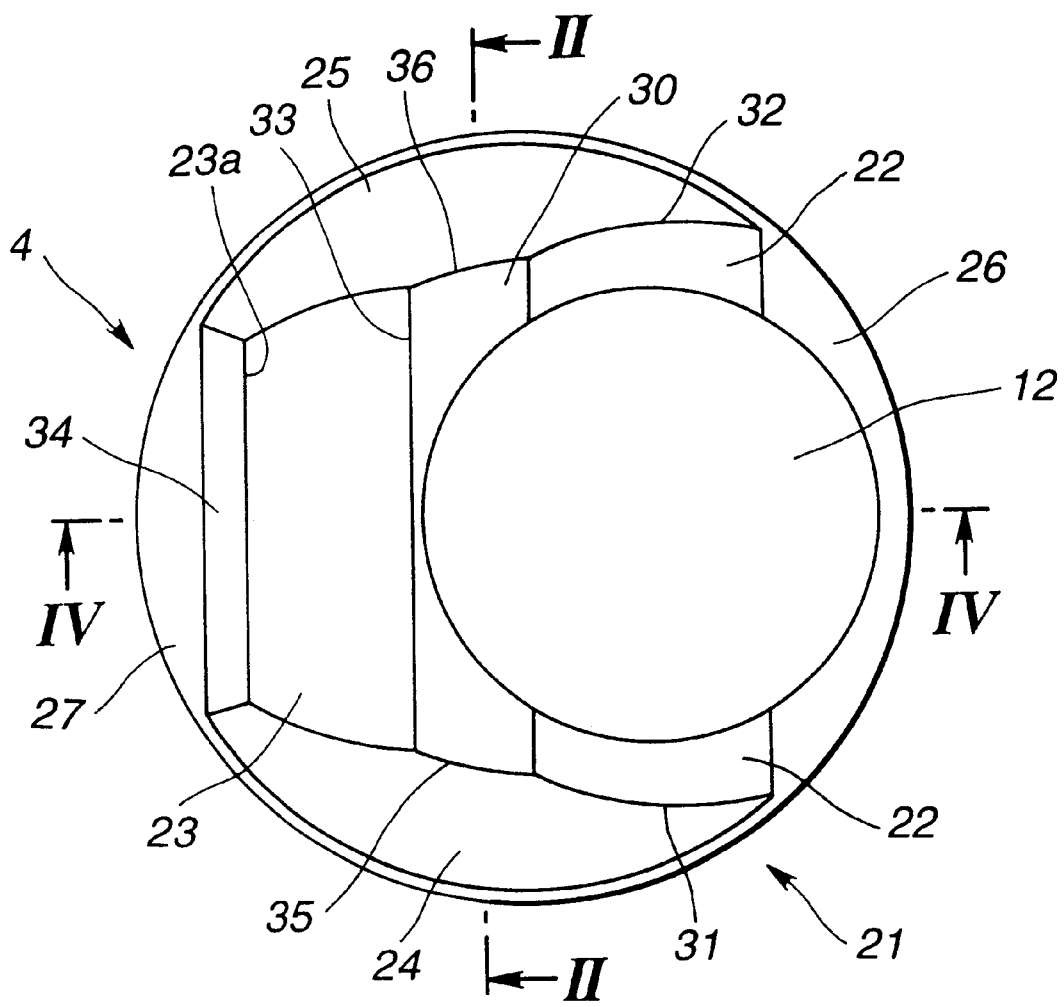
FIG. 3 is a plan view showing a piston according to a first embodiment of this invention.
Figure 4:
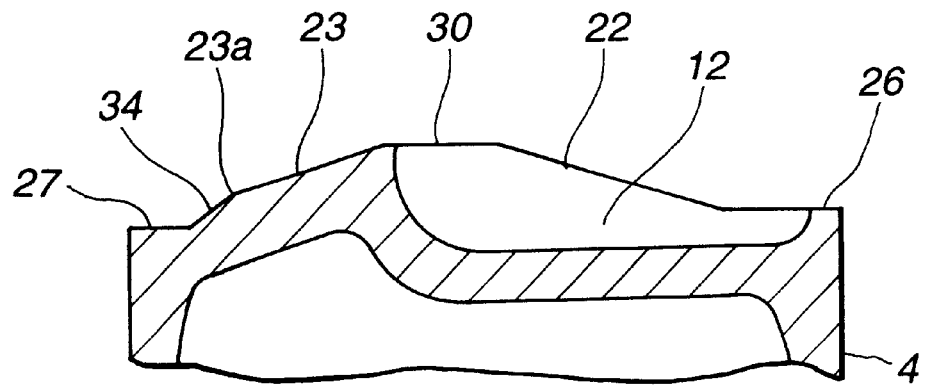
FIG. 4 is a cross-sectional view taken along the line IV–IV in FIG. 3.
Figure 5:
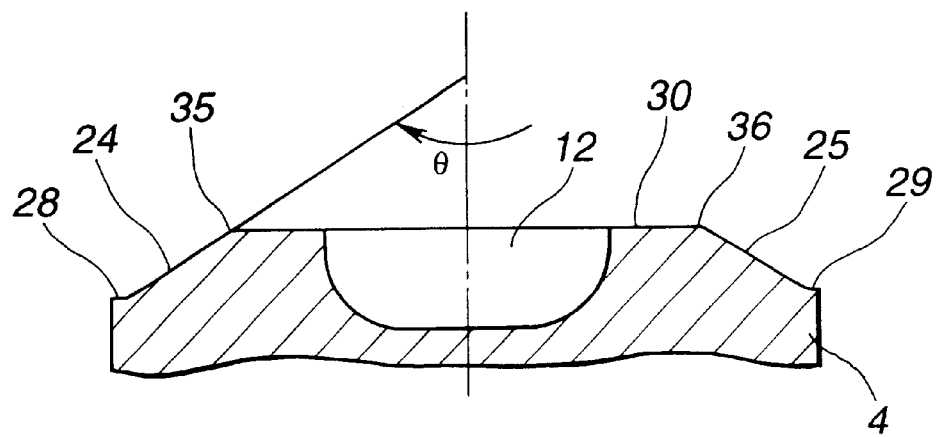
FIG. 5 is a cross-sectional view taken along the line V–V in FIG. 3.

Next, the configuration of the piston 4, particularly the configuration of the top section of the piston 4, will be described in detail with reference to FIGS. 3 to 5.

The top surface of piston 4 has a projection section 21 so that the cavity combustion chamber 12 occupies almost the entire part of the space inside the cylinder 3 at top dead center. This projection section 21 is constituted basically by five surfaces. The projection section 21 is constituted by: an intake valve-side inclined surface 22 and an exhaust valve-side inclined surface 23 which are respectively constituted of parallel planes which are generally parallel with the two inclined surfaces 11a, 11b constituting the pent roof type combustion chamber 11; a top horizontal surface 30 which is formed band-shaped so as to connect the upper edge of the intake valve-side inclined surface 22 and the upper edge of the exhaust valve-side inclined surface 23, and is constituted as a plane perpendicular to the center axis of the piston 4; and a pair of conical side surfaces 24, 25 constituted respectively of conical planes each of which is coaxial with the outside circle of the piston 4 and gradually inclines.

Generally crescent-shaped intake valve-side horizontal surface 26 and exhaust valve-side horizontal surface 27 are respectively formed outside the above-mentioned intake valve-side inclined surface 22 and exhaust valve-side inclined surface 23. The intake valve-side horizontal surface 26 and exhaust valve-side horizontal surface 27 lie in one plane which is perpendicular to the center axis of the piston 4, so that they correspond respectively to squish areas 2a, 2b (see FIG. 1) which are left as flat planes at the opposite sides of the combustion chamber 11 on the side of the cylinder head 2. Very narrow horizontal surfaces 28, 29 are left between the arcuate lower edges of the conical side surfaces 24, 25 and the outer peripheral edge of the piston 4 (see FIG. 5). These horizontal surfaces 26, 27, 28, 29 lie in one plane and at the same height position. Further, in this embodiment, in consideration of compression ratios, a step section 34 exists between the lower edge 23a of the exhaust valve-side inclined surface 23 and the exhaust valve-side horizontal surface 27. This step section 34 is constituted as a plane which is inclined with respect to the exhaust valve-side inclined surface 23.

The cavity combustion chamber 12 is recessed through three surfaces, i.e., the top horizontal surface 30, the intake valve-side inclined surface 22, and the intake valve-side horizontal surface 26. The cavity combustion chamber 12 is round in a plan view of the piston 4 and has a diameter larger than the radius of the piston 4. The bottom surface of the cavity combustion chamber 12 is in a plane perpendicular to the center axis of the piston 4 and is dish-shaped so that its inner peripheral side wall surface is gradually taperingly spread in an upward direction. The cross-sectional area of chamber 12 continually increases as the chamber 12 approaches the top of the piston.

The outer periphery of the cavity combustion chamber 12 is located inside a pair of intake valve-side side ridgelines 31, 32, so that the intake valve-side inclined surface 22 is left in a band-shape at the opposite sides of the cavity combustion chamber 12. Similarly, a part of the outer periphery of the cavity combustion chamber 12 that is close to the exhaust valves is located slightly one-sided and nearer to the intake valves than to an exhaust valve-side top ridgeline 33 (between the top horizontal surface 30 and the exhaust valve-side inclined surface 23), so that a small portion of the top horizontal surface 30 is left between the ridgeline 33 and the outer periphery of the cavity combustion chamber 12. In other words, the outer periphery of the cavity combustion chamber 12 does not intersect the respective ridgelines 31, 32, 33 and is not cut out by these lines. Additionally, as shown in FIG. 2, the spark plug 7 is disposed to enter the cavity combustion chamber 12 at an outer peripheral section of the cavity combustion chamber when the piston 4 is at the top dead center.

An apex angle (see FIG. 5) of the conical side surfaces 24, 25 in the above-mentioned projection section 21 is set as small as possible keeping the horizontal surface 28, 29 as narrow as it is in order that the ridgelines 35, 36 between the conical side surfaces 24, 25 and the top horizontal surface 30 are located at the side of the outer periphery of the piston 4. Because of this, when the piston 4 is at top dead center, a clearance produced between the conical side surfaces 24, 25 and the combustion chamber 11 at the side of the cylinder head 2 is made very small, so that the major part of the volume left inside the cylinder 3 is occupied by the cavity combustion chamber 12.

The structure of the top section of the piston 4 configured as discussed above is formed symmetrical with respect to a diametrical line (line IV–IV in FIG. 3), serving as a center, directed perpendicular to the piston pin. The fuel injector valve 10 is located to inject fuel along this line.

In the above-described arrangement, the cavity combustion chamber 12 has a round shape, and therefore swirl produced in the cylinder 3 during stratified charge combustion is smoothly guided into the cavity combustion chamber 12 and preserved with a sufficient intensity. Then, when the piston 4 comes near its top dead center position after fuel is injected toward the cavity combustion chamber 12 at the latter half of the compression stroke, the three planes, i.e., the top horizontal surface 30 surrounding the cavity combustion chamber 12, the intake valve-side inclined surface 22, and the intake valve-side horizontal surface 26 respectively approach corresponding planes at the side of the cylinder head 2, so that the cavity combustion chamber 12 is well sealed at its whole periphery. Accordingly, combustion proceeds and leakage of the swirl and air-fuel mixture is prevented. As a result, stable stratified charge lean combustion is made possible without forming the intake ports 8 as helical ports, and therefore maximum power output is provided.

During homogeneous charge combustion, a tumble stream is formed inside the cylinder 3 under the action of fresh air from the pair of the intake ports 8, and fuel injection is made in the intake stroke. Fuel supplied into the cavity combustion chamber is easily washed away by the tumble stream and is thus prevented from stagnating because the cavity combustion chamber 12 is dish-shaped with its inner peripheral side wall surface gradually taperingly spread at its upper section. The round cavity combustion chamber 12 is located on the center line between the pair of intake ports 8 to which the tumble stream is concentrated. Accordingly, a homogeneous air-fuel mixture can be formed even at a high load, thereby making good homogeneous charge combustion possible.

Second Embodiment

Figure 6:
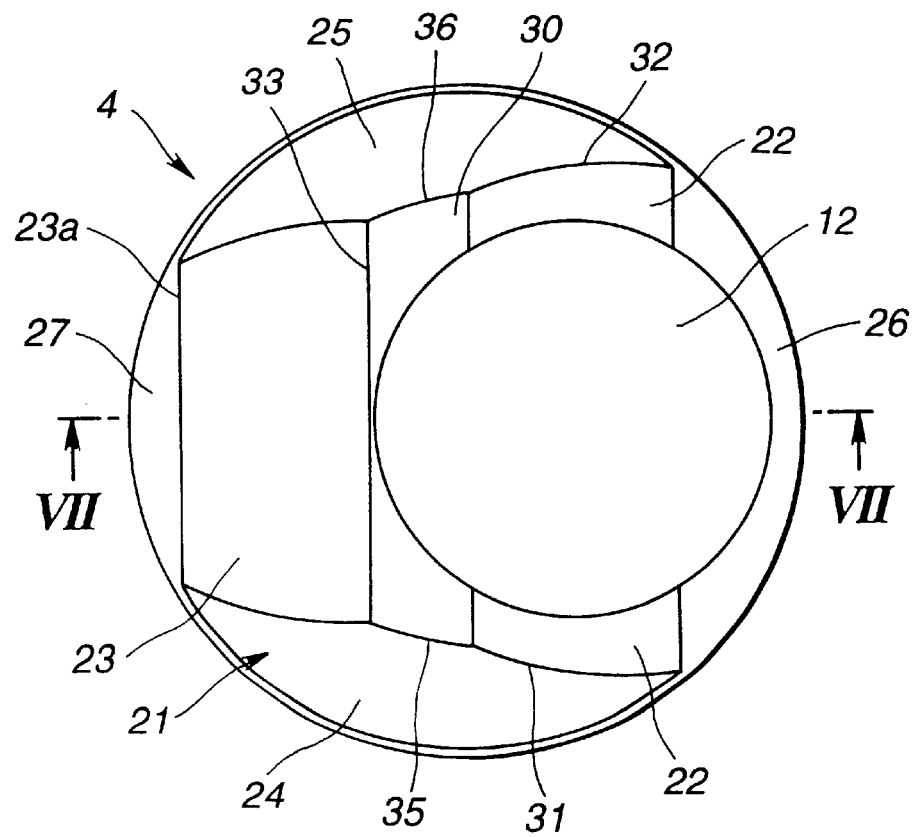
FIG. 6 is a plan view of a piston according to a second embodiment of this invention.
Figure 7:
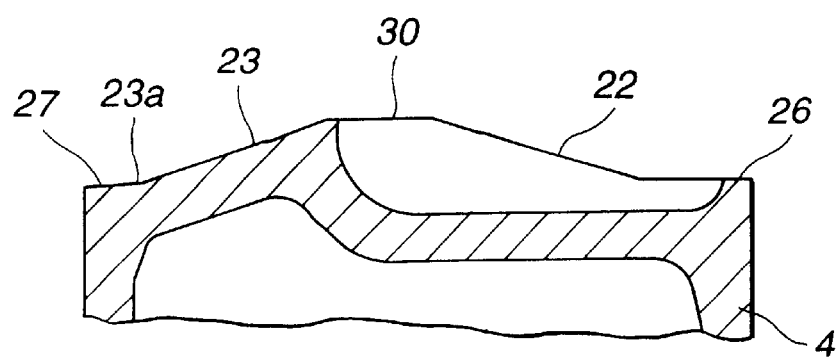
FIG. 7 is a cross-sectional view taken along the line VII–VII in FIG. 6.
Figure 8:
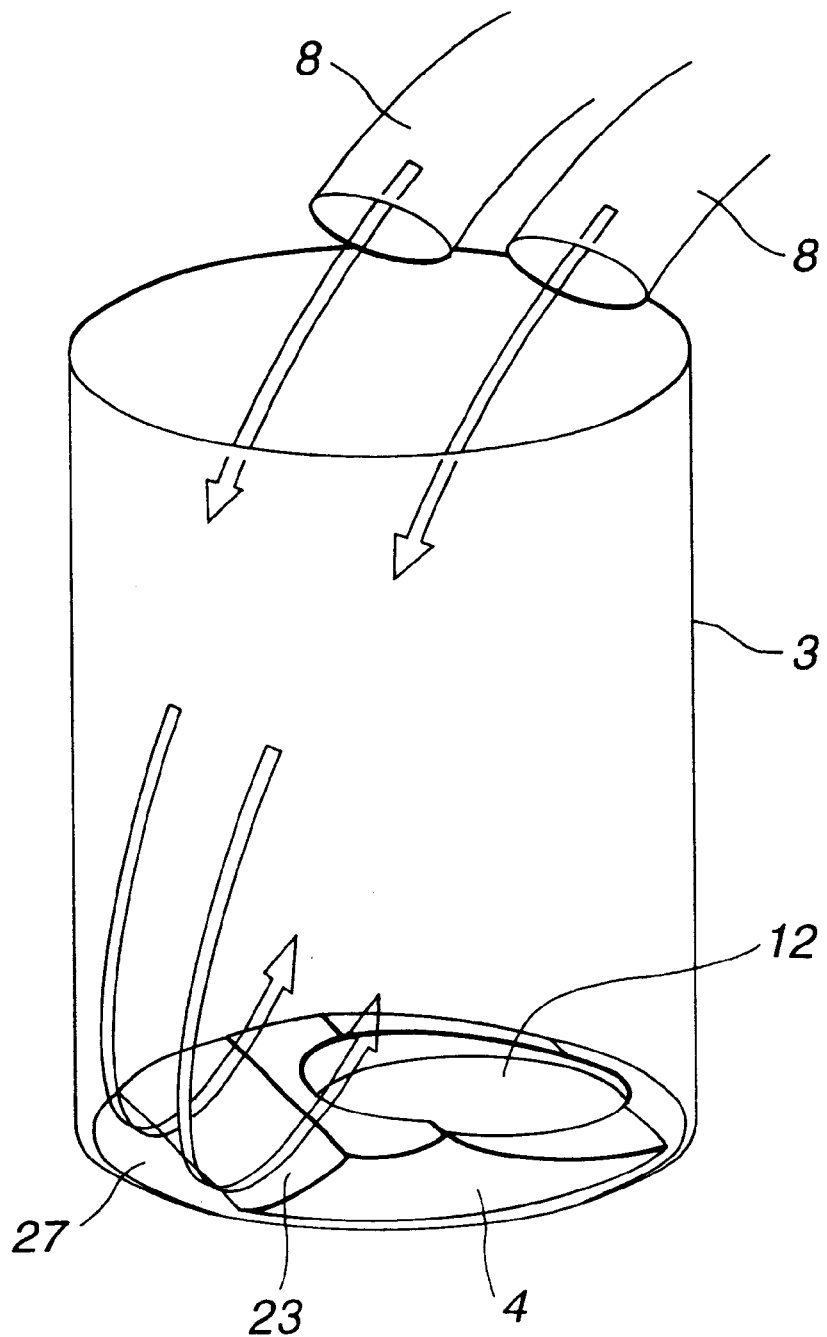
FIG. 8 is an explanatory view showing flow within a cylinder under the action of a piston during homogeneous charge combustion.

FIGS. 6 to 8 will be used to describe a second embodiment of a piston 4 according to this invention.

In this embodiment, the step section 34 between the exhaust valve-side inclined surface 23 and the exhaust valve-side horizontal surface 27 is omitted, so that the lower edge 23a of the exhaust valve-side inclined surface 23 reaches the exhaust valve-side horizontal surface 27.

In the arrangement of the second embodiment, as shown in FIG. 8, during homogeneous charge combustion (in which fresh air is introduced from both intake ports 8) a tumble stream as indicated by arrows can move smoothly from the exhaust valve-side horizontal surface 27 to the exhaust valve-side inclined surface 23. (The flow will vary from that shown in FIG. 8 as the position of the piston within the cylinder changes.) In other words, attenuation of the tumble stream due to unevenness caused by the step section 34 in the first embodiment is reduced, thereby preserving the tumble component during the compression stroke. As a result, HC (hydrocarbon) emissions at a fully opened state can be reduced.

Third Embodiment

FIGS. 9 to 15 illustrate a third embodiment of the invention.

A variety of variable valve operating mechanisms have been hitherto proposed to variably control valve lift characteristics such as opening and closing timings, the operating angle, and the like, of intake valves and exhaust valves of internal combustion engines, in accordance with engine operating conditions. For example, Japanese Utility Model Provisional Publication No. 57-198306 and Japanese Patent Provisional Publication No. 6-185321 disclose a variable valve operating mechanism in which the valve operating angle can be varied under irregular speed rotation of a camshaft. Systems where two kinds of cams are selectively used and systems where the phase of a camshaft relative to a crankshaft is retarded or advanced, and other types of systems are known.

If a variable valve operating mechanism is intended to be applied to, for example, the intake valve side of a direct injection type internal combustion engine, it becomes necessary to form a valve recess at the piston top section in order to avoid interference between the intake valve and the piston. However, if the valve recess is merely added, the inside and outside of the cavity combustion chamber may be brought into communication through the valve recess, and therefore performance during stratified charge combustion is reduced.

Figure 9:
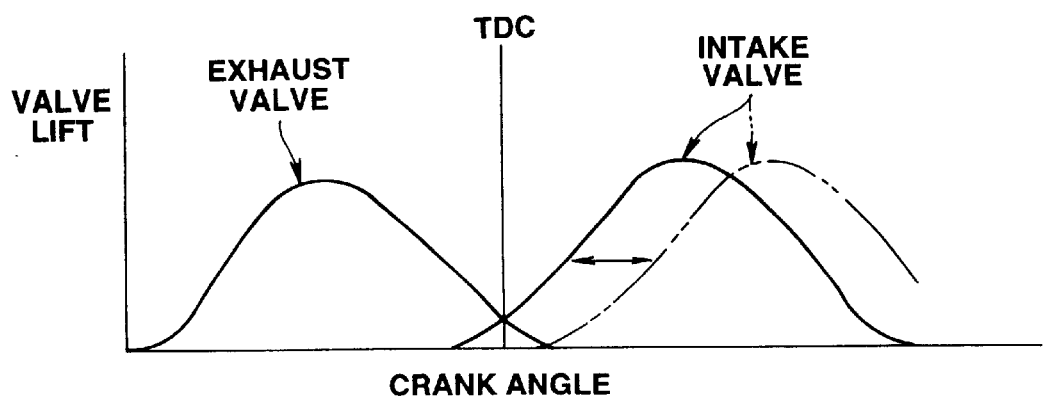
FIG. 9 is a characteristic graph showing an example of valve lift characteristics of an intake valve.
Figure 10:
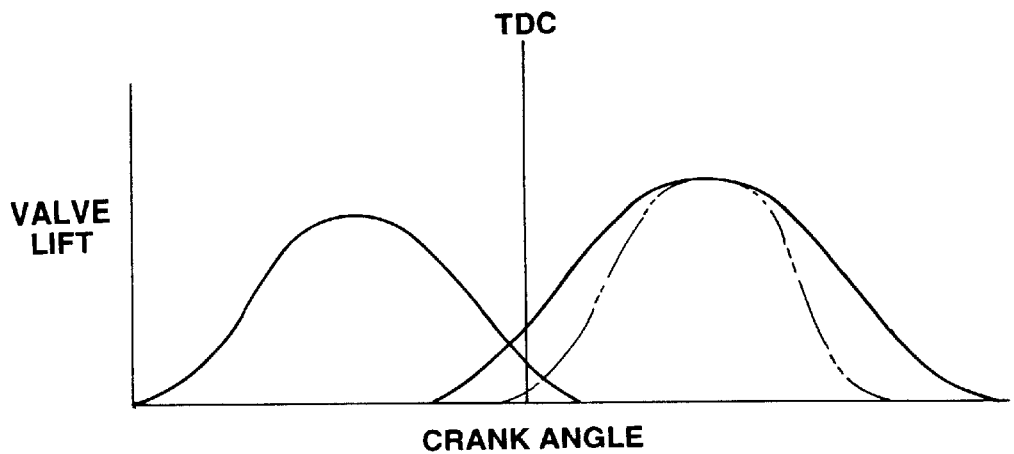
FIG. 10 is a characteristic graph showing another example of valve lift characteristics of an intake valve.
Figure 11:
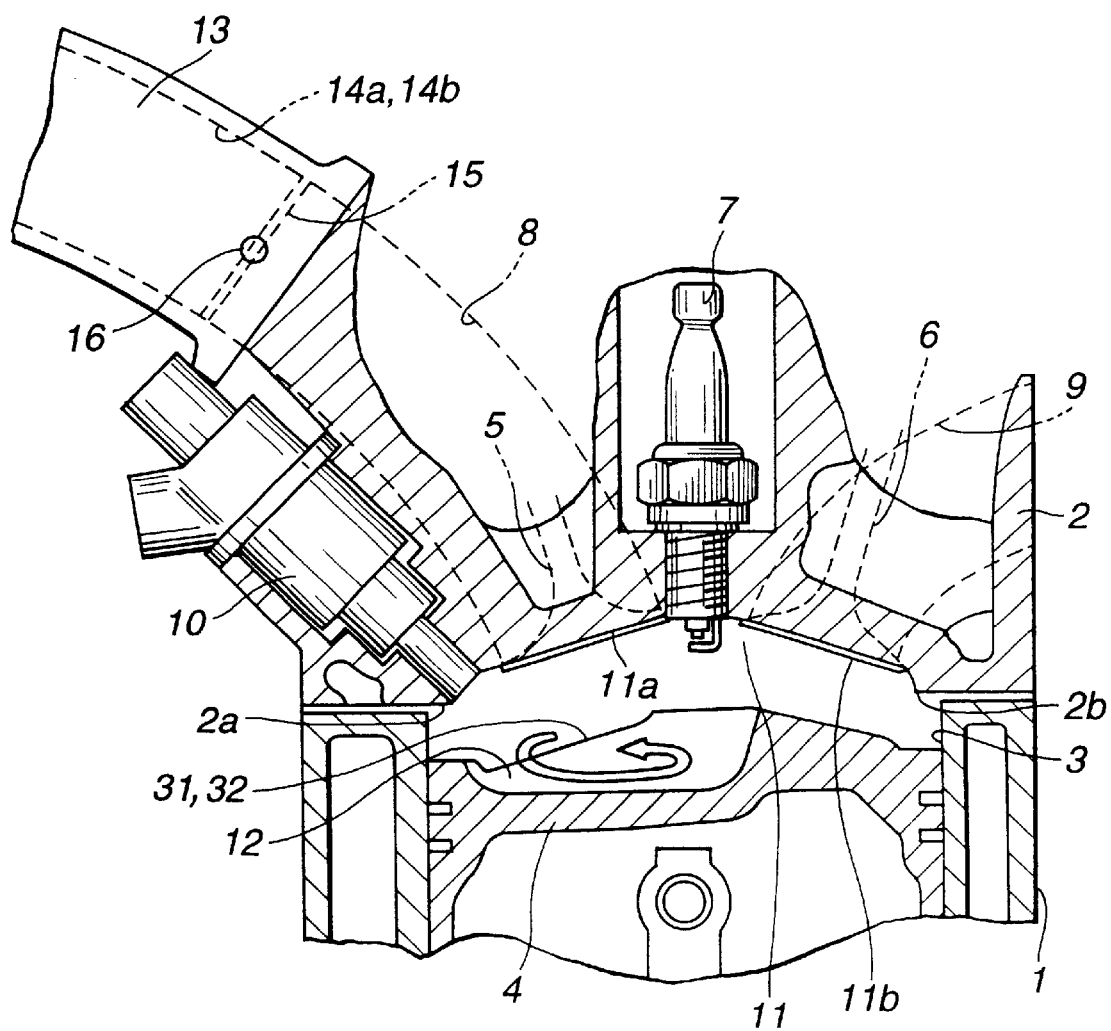
FIG. 11 is a vertical cross-sectional view showing an arrangement of a direct injection type internal combustion engine according to a third embodiment of the present invention.

In this embodiment, a known variable valve operating mechanism is provided for the intake valves 5, so that the valve lift characteristics of the intake valves can be variably controlled in accordance with engine operating conditions. Examples of valve lift characteristics obtained by a variable valve operating mechanism are shown in FIGS. 9 and 10. In FIG. 9, the opening and closing timings are retarded or advanced while the operating angle is kept constant. In FIG. 10, the operating angle increases or decreases while the valve center angle is kept constant.

Figure 14:
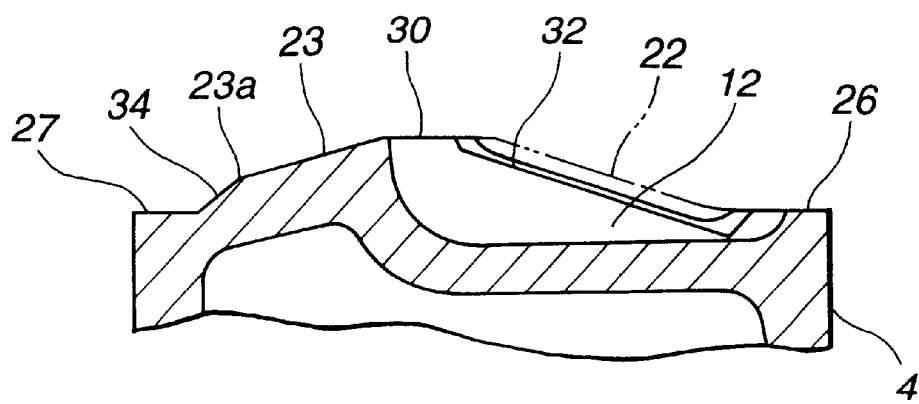
FIG. 14 is a cross-sectional view taken along the line XIV–XIV in FIG. 13.
Figure 15:
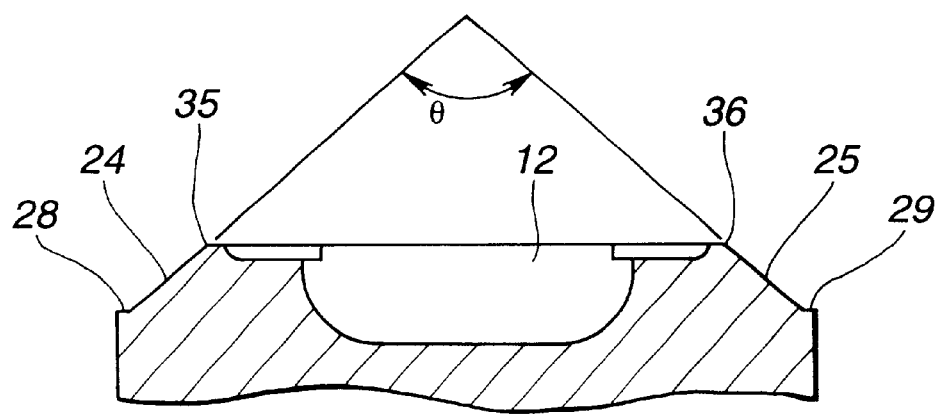
FIG. 15 is a cross-sectional view taken along the line XV–XV in FIG. 13.

As shown in FIGS. 11 to 15, this embodiment is similar to the FIG. 1 embodiment except that in this embodiment, the intake valve-side inclined surface 22 is not left as a plane surface due to the formation of valve recesses 31, 32 (discussed below) and the cavity combustion chamber 12, and therefore surface 22 is shown as an imaginary plane, as indicated by a dotted line in FIG. 14.

A pair of valve recesses 31, 32 is formed recessed corresponding to the valve head sections of the intake valves 5 at the intake valve-side inclined surface 22. These valve recesses 31, 32 are formed in a relatively shallow circular-shape and at the valve inclination angle. They are superposed on the cavity combustion chamber 12 so that each of them appears as a crescent shape. In this embodiment, a part of the outer periphery of these valve recesses 31, 32 reaches the top horizontal surface 30, the conical side surfaces 24, 25, and the intake valve-side horizontal surface 26. Recesses 31, 32 allow a large intake valve lift amount.

Figure 12:
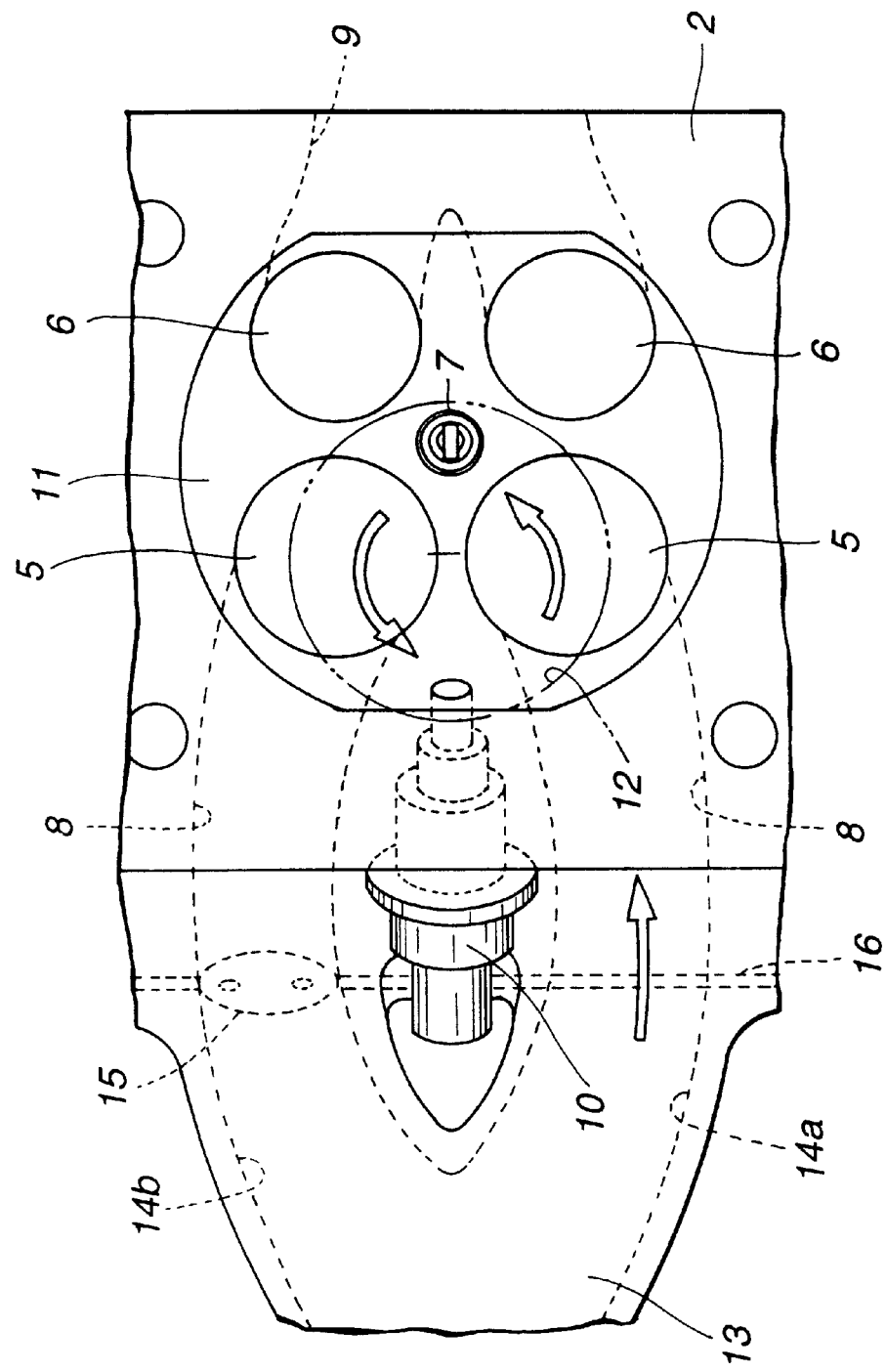
FIG. 12 is a bottom view showing a cylinder head in a state as viewed from a lower surface side.
Figure 13:
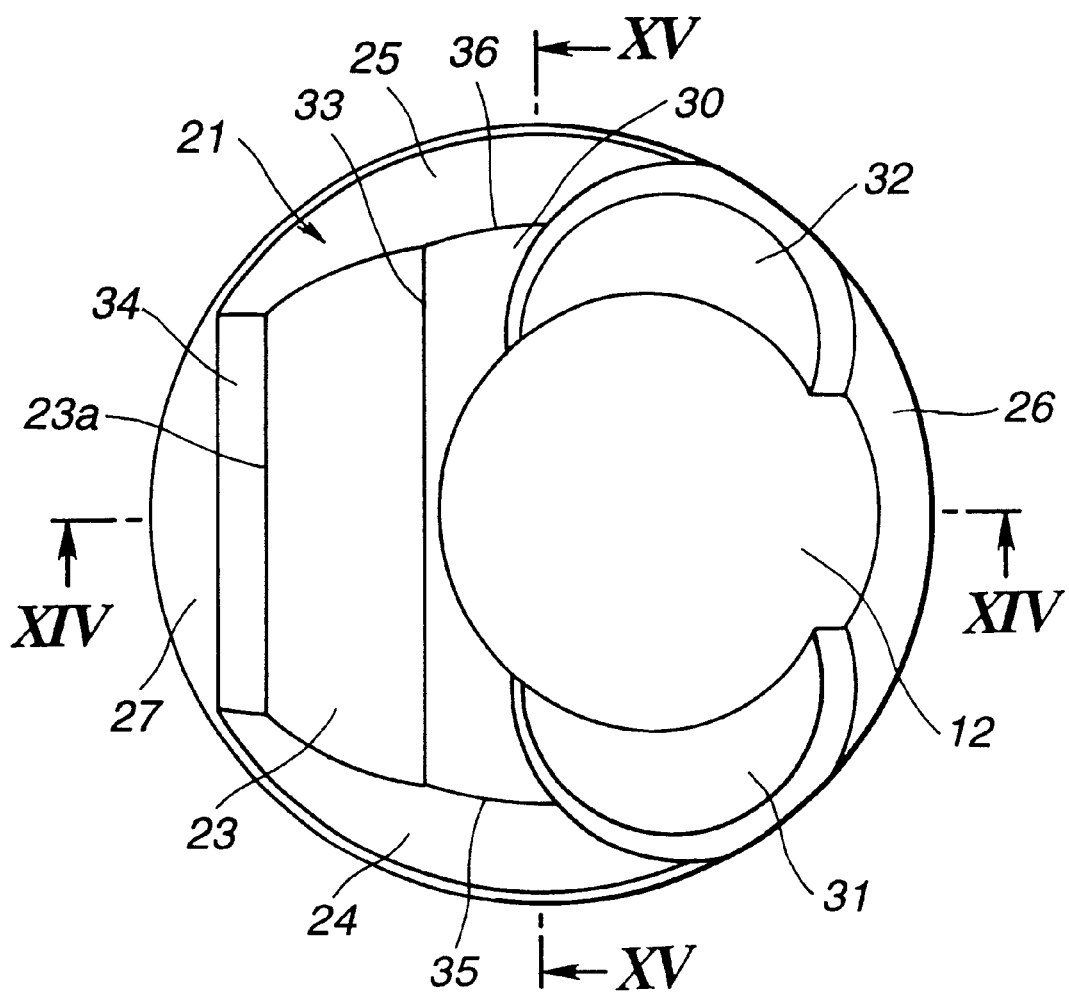
FIG. 13 is a plan view showing a piston according to the third embodiment of this invention.

The outer periphery of the cavity combustion chamber 12 is located inside a pair of imaginary side ridgelines produced between the conical side surfaces 24, 25 and the intake valve-side inclined surface 22. In other words, in the direction of the piston pin axis, the intake valve-side inclined surface 22 is larger than the cavity combustion chamber 12. Similarly, a part of the outer periphery of the cavity combustion chamber 12 that is near the exhaust valves is located slightly one-sided and nearer to the intake valves than exhaust valve-side top ridgeline 33 (between the top horizontal surface 30 and the exhaust valve-side inclined surface 23) so that a small width of the top horizontal surface 30 is left between the ridgeline 33 and the outer periphery of the cavity combustion chamber 12. In other words, the outer periphery of the cavity combustion chamber 12 does not intersect the exhaust valve-side top ridgeline 33. Step section 34 can be used to vary the compression ratio. Additionally, as shown in FIG. 12, the spark plug 7 is disposed to enter the cavity combustion chamber 12 and to be located at the outer peripheral section of the cavity combustion chamber when the piston 4 is at the top dead center.

The ridgelines 35, 36 are located at the side of the outer periphery of the piston 4, and therefore the length of the top horizontal surface 30 in the direction of the piston pin axis generally extends throughout the entire width of the piston, in the direction of the piston pin axis, where the pair of valve recesses 31, 32 is formed.

In this arrangement, the cavity combustion chamber 12 is round, and therefore swirl produced in the cylinder 3 during stratified charge combustion is smoothly guided in the cavity combustion chamber 12 and preserved with a sufficient intensity. When the piston 4 comes near its top dead center position after fuel is injected toward the cavity combustion chamber 12 at the latter half of the compression stroke, the three planes, i.e., the top horizontal surface 30 surrounding the cavity combustion chamber 12, the intake valve-side inclined surface 22 (actually the bottom surfaces of the valve recesses 31, 32), and the intake valve-side horizontal surface 26 respectively approach the corresponding planes at the side of the cylinder head 2, so that the cavity combustion chamber 12 is well sealed along its entire periphery. Accordingly, combustion proceeds and leakage of swirl and air-fuel mixture from inside the cavity combustion chamber 12 is prevented. As a result, stable stratified charge lean combustion is accomplished without forming the intake ports 8 as helical ports, and therefore maximum power output is provided.

The top horizontal surface 30 between the cavity combustion chamber 12 or the valve recesses 31, 32 and the exhaust valve-side inclined surface 23 is maintained even though valve recesses 31, 32 are formed recessed and superposed on the cavity combustion chamber 12. As a result, adverse influence due to formation of the valve recesses 31, 32 is very small, and therefore sufficiently good stratified charge combustion can be ensured.

As discussed above, the valve recesses are formed recessed at the intake valve-side inclined surface, at which a part of the outer periphery of the cavity combustion chamber appears to be cut out by a valve recesses. However, the band-shaped top horizontal surface exists between the valve recesses and the exhaust valve-side inclined surface along almost the entire width of the piston, and therefore gas flow between the cavity combustion chamber and the exhaust valve side is suppressed, thereby preventing stratified charge combustion from being degraded.

Fourth Embodiment

Figure 16:
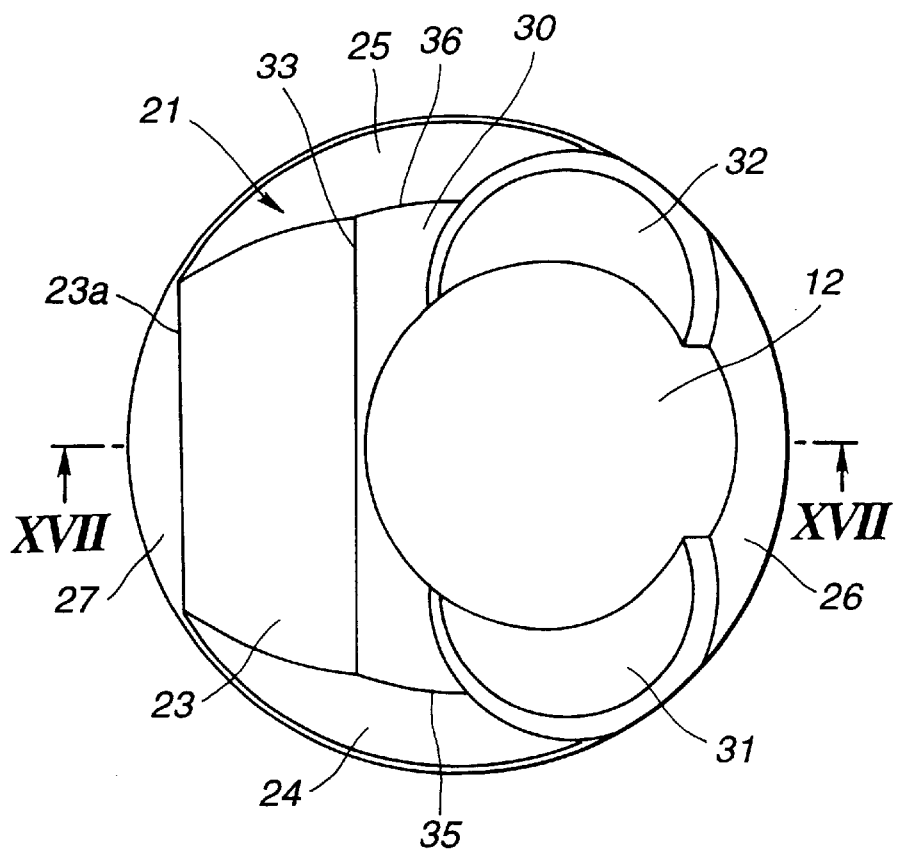
FIG. 16 is a plan view of a piston according to a fourth embodiment of this invention.
Figure 17:
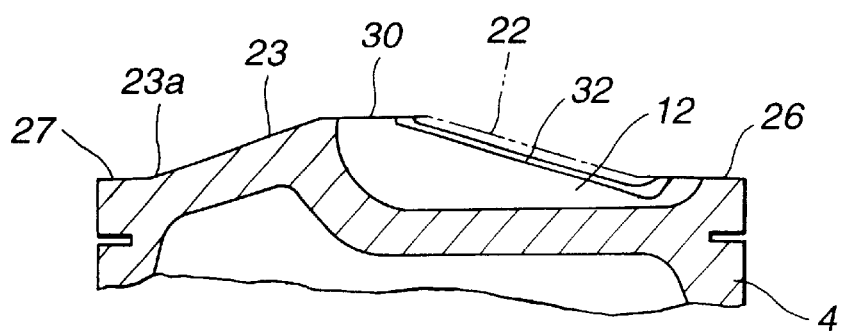
FIG. 17 is a cross-sectional view taken along the line XVII–XVII in FIG. 16.
Figure 18:
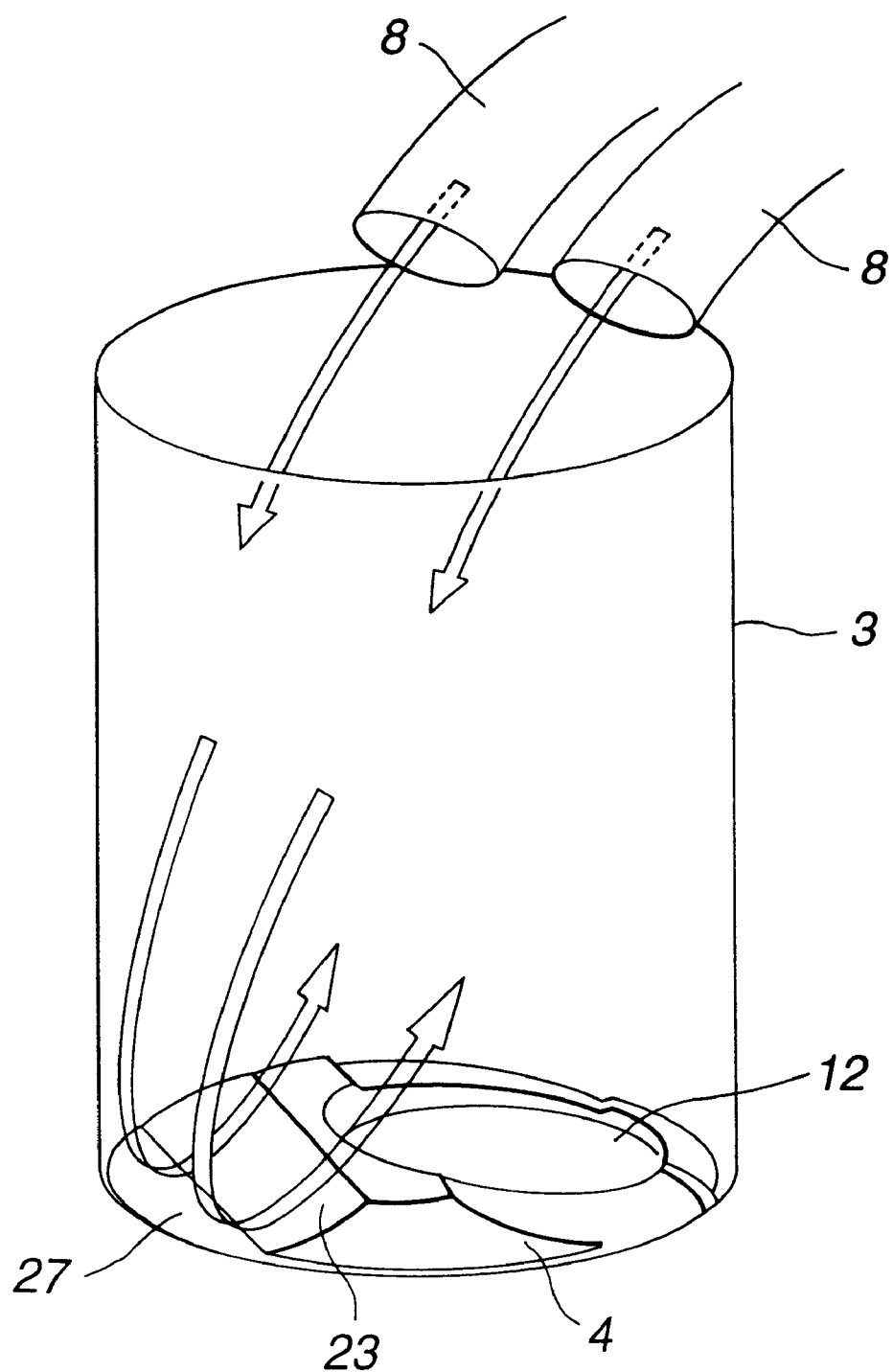
FIG. 18 is an explanatory view showing flow within a cylinder under the action of a piston during homogeneous charge combustion.
Figure 19:
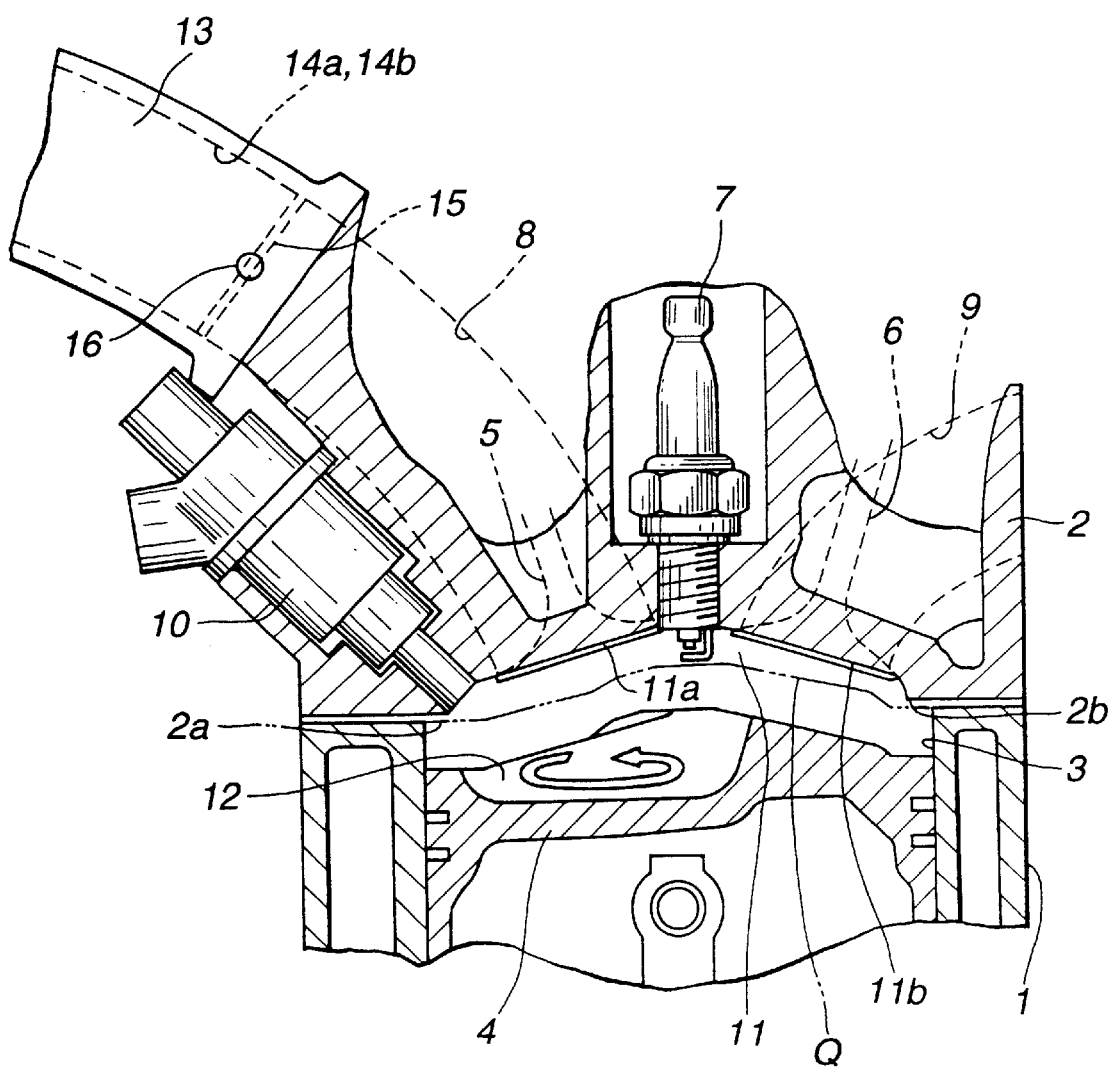
FIG. 19 is a vertical cross-sectional view showing an arrangement of a direct injection type internal combustion engine according to a fifth embodiment of the present invention.

FIGS. 16 to 18 illustrate a fourth embodiment of the invention.

In this embodiment, the above-discussed step section 34 between the exhaust valve-side inclined surface 23 and the exhaust valve-side horizontal surface 27 is omitted, such that the lower edge 23a of the exhaust valve-side inclined surface 23 reaches the exhaust valve-side horizontal surface 27.

In this embodiment, as shown in FIG. 18, during homogeneous charge combustion in which fresh air is introduced from both intake ports 8, the tumble stream (as indicated by arrows) can more smoothly flow from the exhaust valve-side horizontal surface 27 to the exhaust valve-side inclined surface 23. (The flow will vary from that shown in FIG. 18 as the position of the piston within the cylinder changes.) In other words, attenuation of the tumble stream due to unevenness causes by step section 34 is reduced, thereby preserving the tumble component long into the compression stroke. As a result, HC emissions are reduced.

Fifth Embodiment

FIGS. 19 to 24 illustrate a fifth embodiment of the invention.

The configuration of the piston 4 of this embodiment, particularly the configuration of the top section of the piston, will be discussed in detail with reference to FIGS. 19–22.

In this embodiment, the intake valve-side inclined surface 22 is left as only a small part in the vicinity of the top section due to formation of valve recesses 31, 32 and the cavity combustion chamber 12. Therefore, the major part of the intake valve-side inclined surface 22 is an imaginary plane, as indicated by a dotted line in FIG. 22. Additionally, the conical side surfaces 24, 25 are contiguous with each other, extending through the lower edge of the exhaust valve-side inclined surface 23, in this embodiment.

Figure 22:
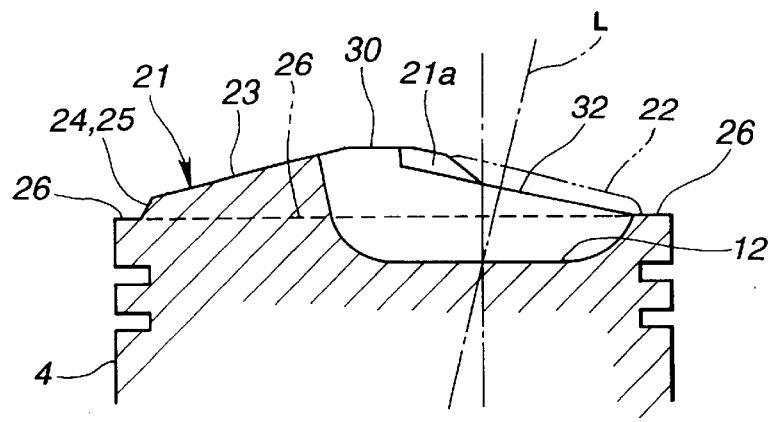
FIG. 22 is a cross-sectional view taken along the line XXII–XXII in FIG. 21.

The apex angle of the conical side surfaces 24, 25 in the projection section 21 is very small, and therefore the conical side surfaces 24, 25 rise steeply, as shown in FIG. 22. Along with this, the location of the ridgelines 35, 36 between the conical side surfaces 24, 25 and the top horizontal surface 30 approaches the outer peripheral side of the piston 4. Because of this, clearance formed between the conical side surfaces 24, 25 and the combustion chamber 11 at the side of the cylinder head 2 is very small when the piston 4 is at top dead center, such that the major portion of volume left in the cylinder 3 is occupied by the cavity combustion chamber 12.

A piston standard horizontal surface 26 is formed at the outer periphery of the projection section 21. This piston standard horizontal surface 26 is constituted as one plane perpendicular to the center axis of the piston 4 and is continuous throughout the entire periphery of the piston 4. Parts at a thrust side and an anti-thrust side of this piston standard horizontal surface 26 correspond respectively to squish areas 2a, 2b (see FIG. 19) left as flat surfaces at opposite sides of the combustion chamber 11 at the side of the cylinder head 2, thereby contributing to production of squish.

Figure 20:
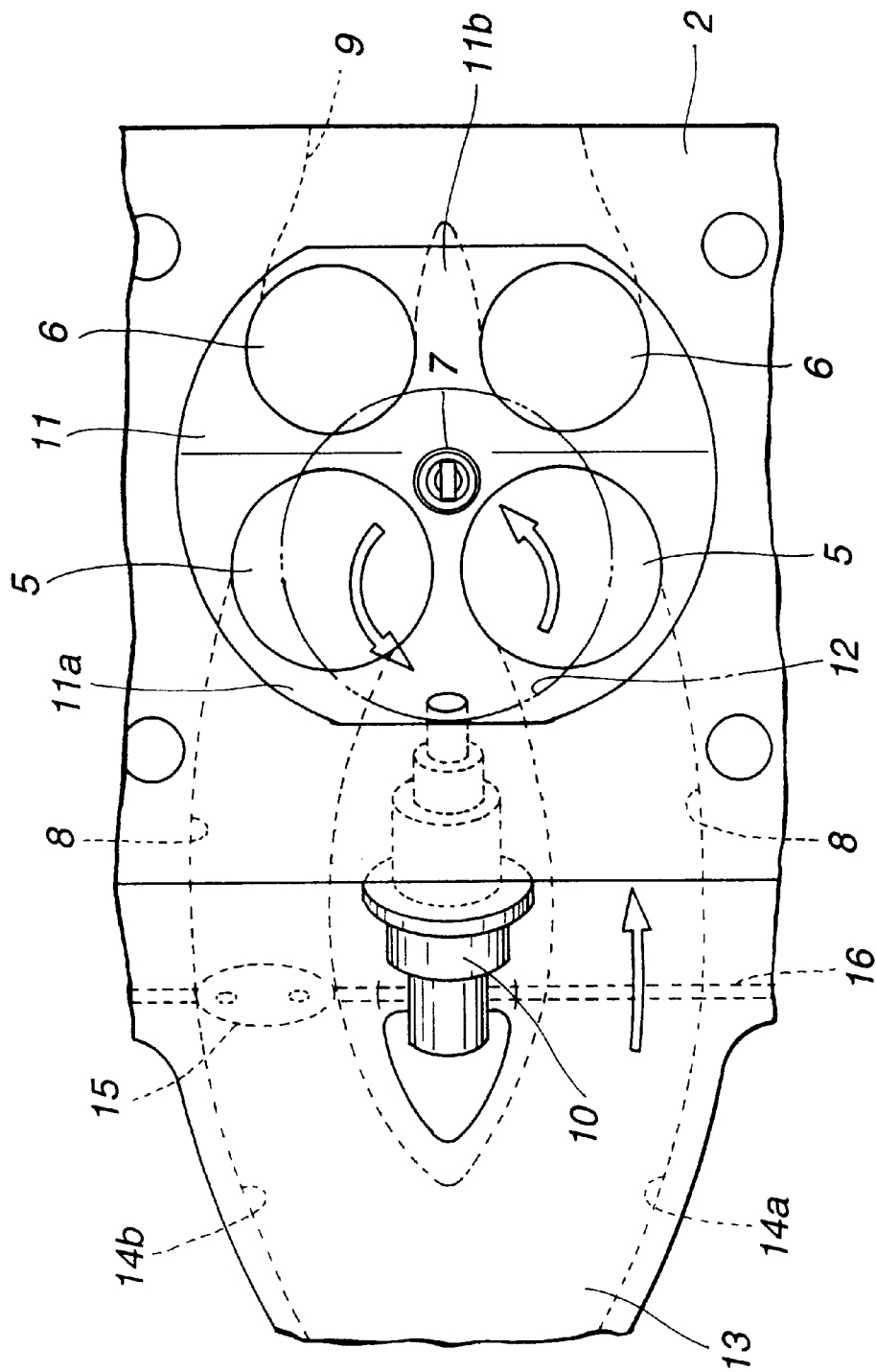
FIG. 20 is a bottom view showing a cylinder head in a state as viewed from a lower surface side.
Figure 21:
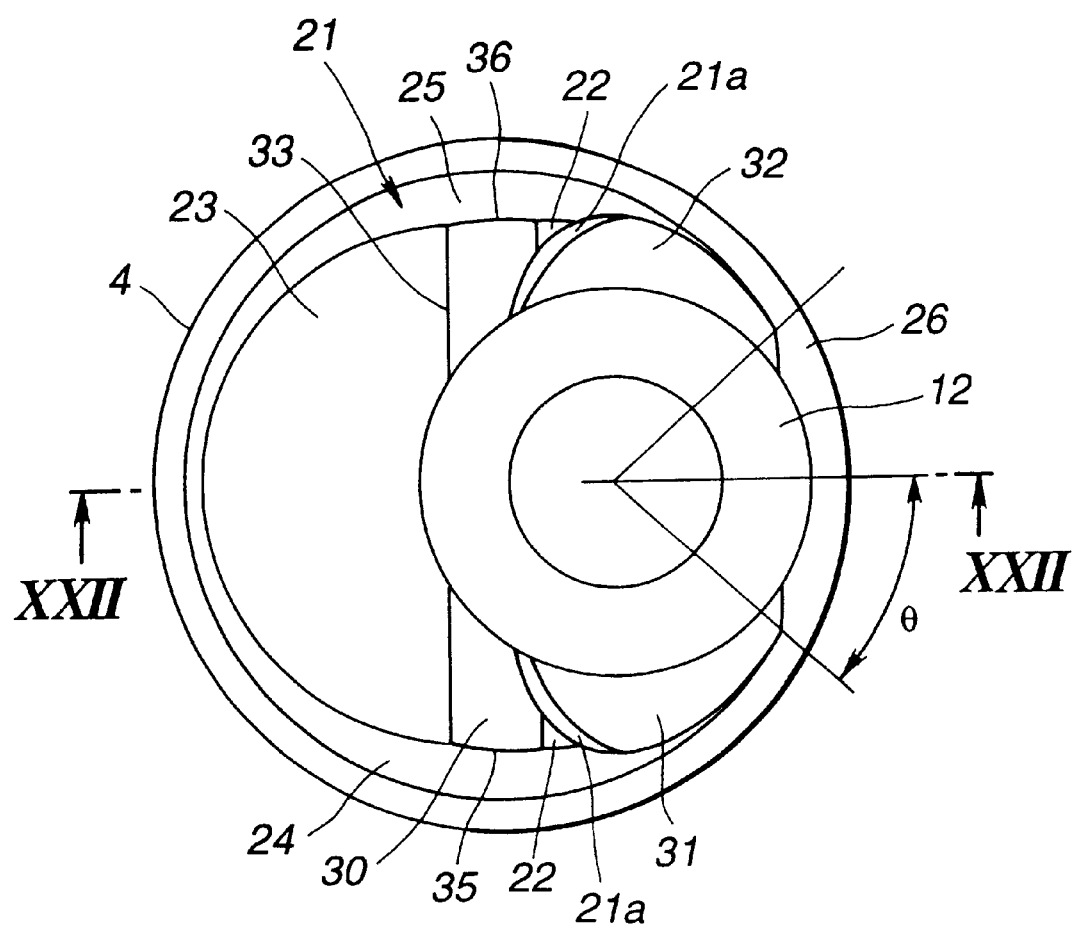
FIG. 21 is a plan view showing a piston according to the fifth embodiment of this invention.

The cavity combustion chamber 12 is recessed throughout the top horizontal surface 30 and the intake valve-side inclined surface 22. The cavity combustion chamber 12 is completely round in a plan view of the piston 4 and has a diameter larger than the radius of the piston 4. The bottom surface of the cavity combustion chamber 12 is in a plane perpendicular to the center axis of the piston 4 and chamber 12 is dish-shaped so that its inner peripheral side wall surface is gradually taperingly spread in an upward direction. Additionally, the outer periphery of the cavity combustion chamber 12 is located inside a pair of imaginary side ridgelines between the conical side surfaces 24, 25 and the intake valve-side inclined surface 22. In other words, in the direction of the piston pin axis, the intake valve-side inclined surface 22 is larger than the cavity combustion chamber 12. In contrast, a portion of the outer periphery of the cavity combustion chamber 12 close to the exhaust valves slightly extends over the exhaust valve-side top ridgeline 33 between the top horizontal surface 30 and the exhaust valve-side inclined surface 23, toward the exhaust valves. This is because, in this embodiment, the piston has a relatively small diameter (such as for a 1.8 liter, 4 cylinder engine). Additionally, as shown in FIG. 20, the spark plug 7 is disposed to enter the cavity combustion chamber 12 and is located at the outer peripheral section of the cavity combustion chamber when the piston 4 is at top dead center.

The valve recesses 31, 32 are formed recessed corresponding to the valve head sections of the intake valves 5 at the intake valve-side inclined surface 22. These valve recesses 31, 32 are formed in a relatively shallow circular-shape and along the valve inclination angle, and are superposed on the cavity combustion chamber 12 such that each recess appears in a crescent shape. The reference character L in FIG. 22 indicates the center axis of each intake valve 5. In this embodiment, a portion of the outer periphery of valve recesses 31, 32 reaches the vicinity of the imaginary side ridgelines between the conical side surfaces 24, 25 and the inclined surface 22. Ridgelines 35, 36 at the opposite ends of the top horizontal surface 30 in the direction of the piston pin axis are located close to the outer periphery of the piston 4, and therefore the ridgelines 35, 36 are located outside the end edge position of each valve recess 31, 32 in the direction of the piston pin axis as viewed in the direction of the piston pin axis. Valve recesses 31, 32 have a depth such that the recesses are not lower than the piston standard horizontal surface 2 in the axial direction of the piston 4. In other words, as apparent from FIG. 22, valve recesses 31, 32 are not depressed below the piston standard horizontal surface 26.

The structure of the top section of the piston 4 configured as discussed above is symmetrical with respect to a diametrical line (or a line XXII—XXII in FIG. 21). serving as a center and perpendicular to the piston pin. Fuel injector valve 10 is located to inject fuel along this line serving as a symmetry axis.

The valve recesses 31, 32 are formed recessed at the intake valve-side inclined surface 22 of the projection section 21, as discussed above, and therefore projection section outer peripheral section 21a is left in the shape of an arcuate dam, along the outer periphery of the valve recesses 31, 32. Valve recesses 31, 32 are gradually lowered in accordance with the inclination of the intake valve-side inclined surface 22 in a direction toward the intake valve side of the piston 4 (in a rightward direction in FIG. 21). The projection section 21 ultimately becomes the same in height as the piston standard horizontal surface 26 and disappears. Here, a line connecting the tip end disappearing point of this projection section 21 and the center of the cavity combustion chamber 12 forms an angle (see FIG. 21) of not larger than 45° (relative to the above-mentioned line XXII—XXII). This minimizes gas flow from the cylinder outer peripheral section through the valve recesses into the cavity combustion chamber.

In the above-discussed arrangement, the cavity combustion chamber 12 is round and therefore swirl produced in the cylinder 3 during stratified charge combustion is smoothly guided into the cavity combustion chamber 12 and preserved with a sufficient intensity. When the piston 4 comes near its top dead center position after fuel is injected toward the cavity combustion chamber 12 at the latter half of the compression stroke, the respective surfaces of the projection section 21 respectively approach the corresponding surfaces of the cylinder head 2 as indicated by a dotted line Q in FIG. 19, so that the cavity combustion chamber 12 is well sealed at its entire periphery. Accordingly, combustion proceeds and leakage of swirl and the air-fuel mixture inside the cavity combustion chamber 12 is prevented from leaking to the outside.

Valve recesses 31, 32 are formed depressed and superposed on the cavity combustion chamber 12. However, valve recesses 31, 32 are not depressed below the piston standard horizontal surface 26. As a result, when the piston 4 is near top dead center, a swirl component along the outer peripheral section of the cylinder 3 does not enter the valve recesses 31, 32 and instead flows on the piston standard horizontal surface 26 at the outer peripheral section, thereby suppressing entrance of this swirl component into the cavity combustion chamber 12. Since the side section of the valve recesses 31, 32 is surrounded by the projection section outer peripheral section 21a, gas flow flowing on the piston standard horizontal surface 26 is suppressed from flowing into the valve recesses 31, 32. Further, since the top horizontal surface 30 extends in the direction of the piston pin axis between a portion of the cavity combustion chamber 12 and valve recesses 31, 32 and the exhaust valve-side inclined surface 23, gas flow from the exhaust valve side of the cylinder 3 toward the cavity combustion chamber 12 is interrupted and weakened. Accordingly, swirl flow and fuel inside the cavity combustion chamber 12 is not disturbed by gas flow from outside of the cavity combustion chamber 12, and adverse influence due to formation of the valve recesses 31, 32 is minimized, thereby ensuring good stratified charge combustion.

Additionally, during homogeneous charge combustion, a bumble stream is formed inside the cylinder 3 under the action of fresh air from the intake ports 8, and fuel injection is made in the intake stroke. Fuel supplied into the cavity combustion chamber 12 is easily washed away by the tumble stream and is thus prevented from stagnating because the cavity combustion chamber 12 is dish-shaped such that its inner peripheral side wall surface is gradually taperingly spread at its upper section. The round-shaped cavity combustion chamber 12 is dish-shaped such that its inner peripheral side wall surface is gradually taperingly spread at its upper section. The round-shaped cavity combustion chamber 12 is located on the center line (the line XXII—XXII in FIG. 21) between the pair of intake ports 8 to which the tumble stream is concentrated. Accordingly, a homogeneous air-fuel mixture is formed even at a high load, thereby making good homogeneous charge combustion possible.

Figure 23:
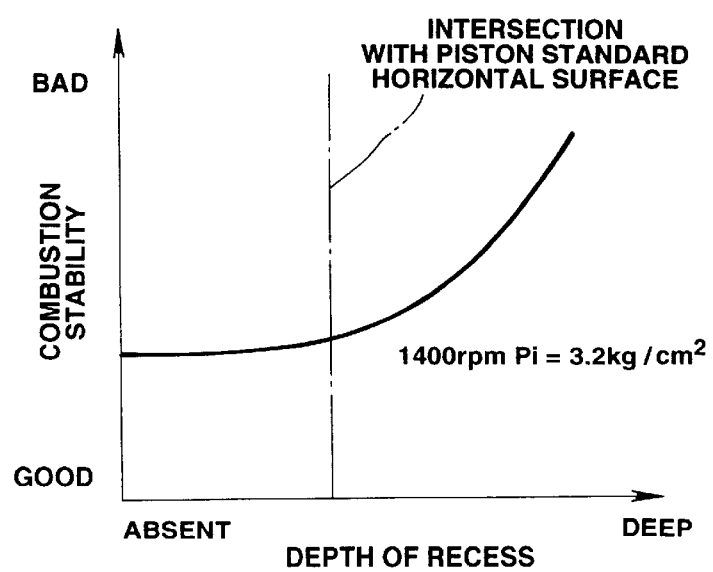
FIG. 23 is a characteristic graph showing the relationship between the depth of a valve recess and the stability of stratified charge combustion.

FIG. 23 shows results of experiments examining the relationship between the depth of the valve recesses 31, 32 and the combustion stability during stratified charge combustion. As shown by FIG. 23, the combustion stability is abruptly degraded if the vale recesses 31, 32 are recessed below the piston standard horizontal surface 26. Conversely, degradation in combustion stability, due to the valve recesses 31, 32, is small if the depth of the vale recesses does not exceed the piston standard horizontal surface 26.

Figure 24:
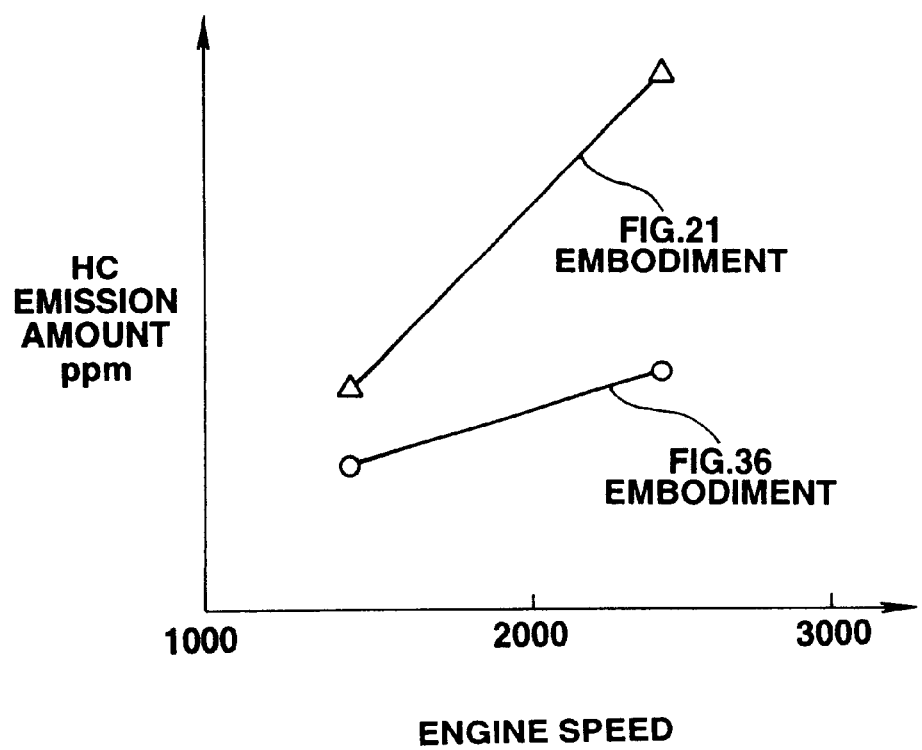
FIG. 24 is a characteristic graph showing the relationship between the presence and absence of a projection section outer peripheral section and the HC emission amount.
Figure 36:
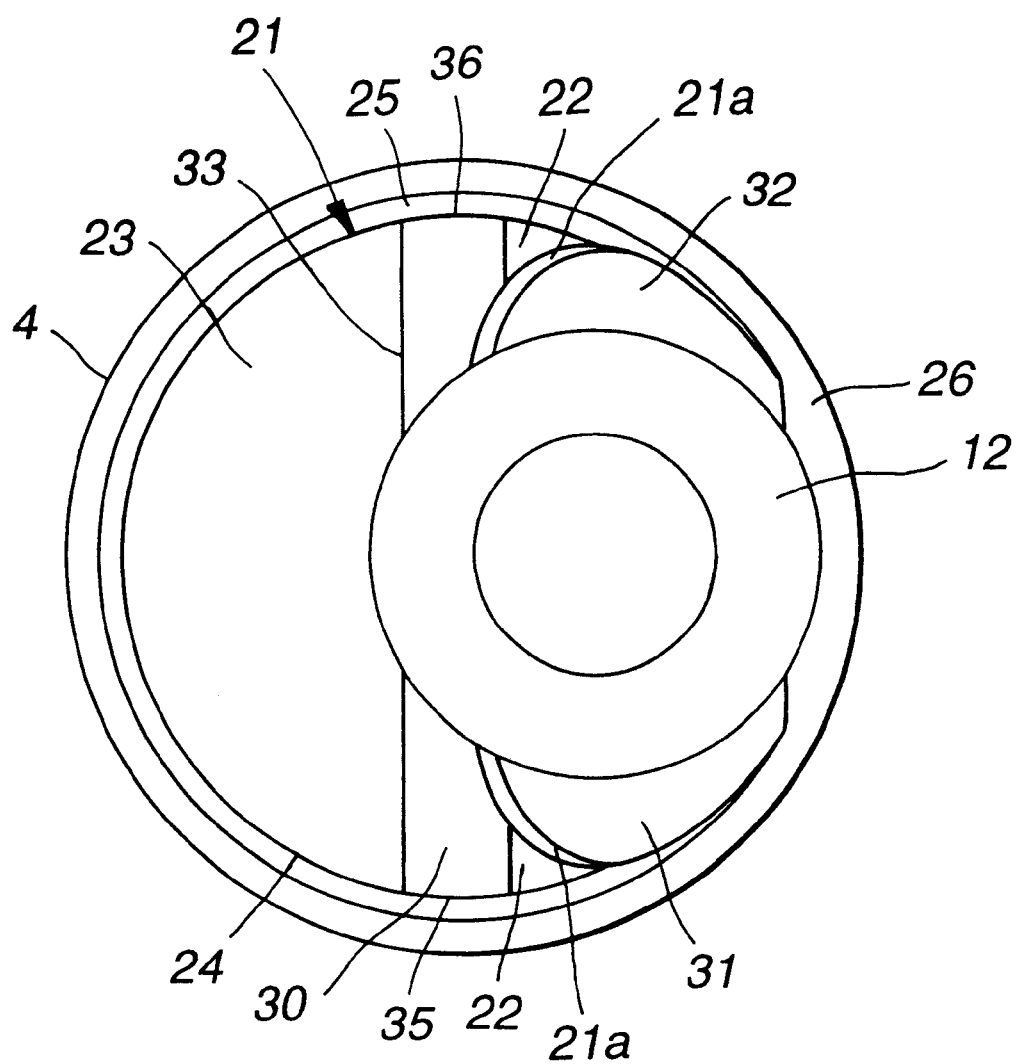
FIG. 36 is a plan view showing a piston according to the eighth embodiment of this invention.

FIG. 24 shows results of experiments which examine the effect of moving the position of ridgelines 35, 36 along the piston pin direction (that is, the length of the top horizontal surface 30). In FIG. 24, one curve indicates HC emission amount in the embodiment of FIG. 36 wherein the top horizontal surface 30 is longer than the combined length of the valve recesses 31, 32 in the piston pin direction. In the FIG. 36 embodiment, the ridgelines 35, 36 are placed near the cylinder wall, that is, closer to the cylinder wall than valve recesses 31, 32, in the piston pin direction. The other curve in FIG. 24 indicates HC emission amount for the FIG. 21 embodiment. In the FIG. 21 embodiment, ridgelines 35, 36 are inside the ridges of the valve recesses 31, 32 in the piston pin direction. In other words, in the FIG. 21 embodiment, the length of top horizontal surface 30 is shorter than the combined length of the valve recesses 31, 32. As apparent from a comparison between these two curves, lowering of the HC emission amount can be achieved by positioning the ridgelines 35, 36, on the periphery of piston 4.

This embodiment provides for a large valve lift amount at top dead center. Also, the swirl component turning along the cylinder outer peripheral section is prevented from flowing into the cavity combustion chamber through the valve recess during stratified charge combustion.

Sixth Embodiment

FIGS. 25 to 31 illustrate a sixth embodiment of the invention.

According to the sixth embodiment, the fuel injection valve injects the fuel toward a portion of the swirl upstream of the ignition plug, thereby causing the injected fuel to be stratified at a portion of the swirl upstream of the ignition plug to enable the fuel spray to be surely ignited, which results in the further improvement of the stability of the super-lean burning. Moreover, this reduces the amount of fuel directly injected, thereby reducing the amount of fuel deposited to the ignition plug, which results in improvement of the cold start-ability of the internal combustion engine.

Figure 25:
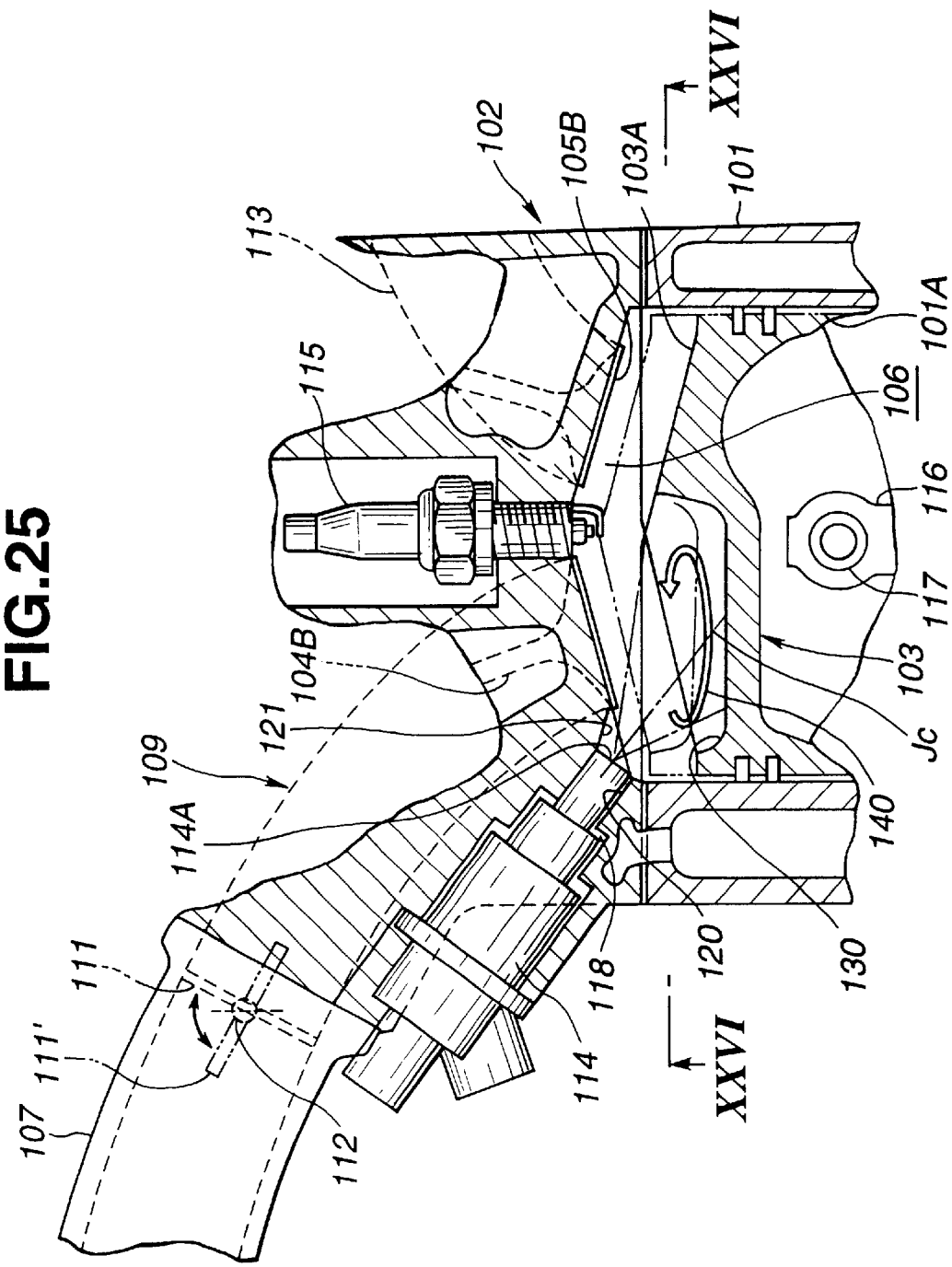
FIG. 25 is a vertical sectional view of a direct injection type internal combustion engine according to a sixth embodiment of the invention.
Figure 26:
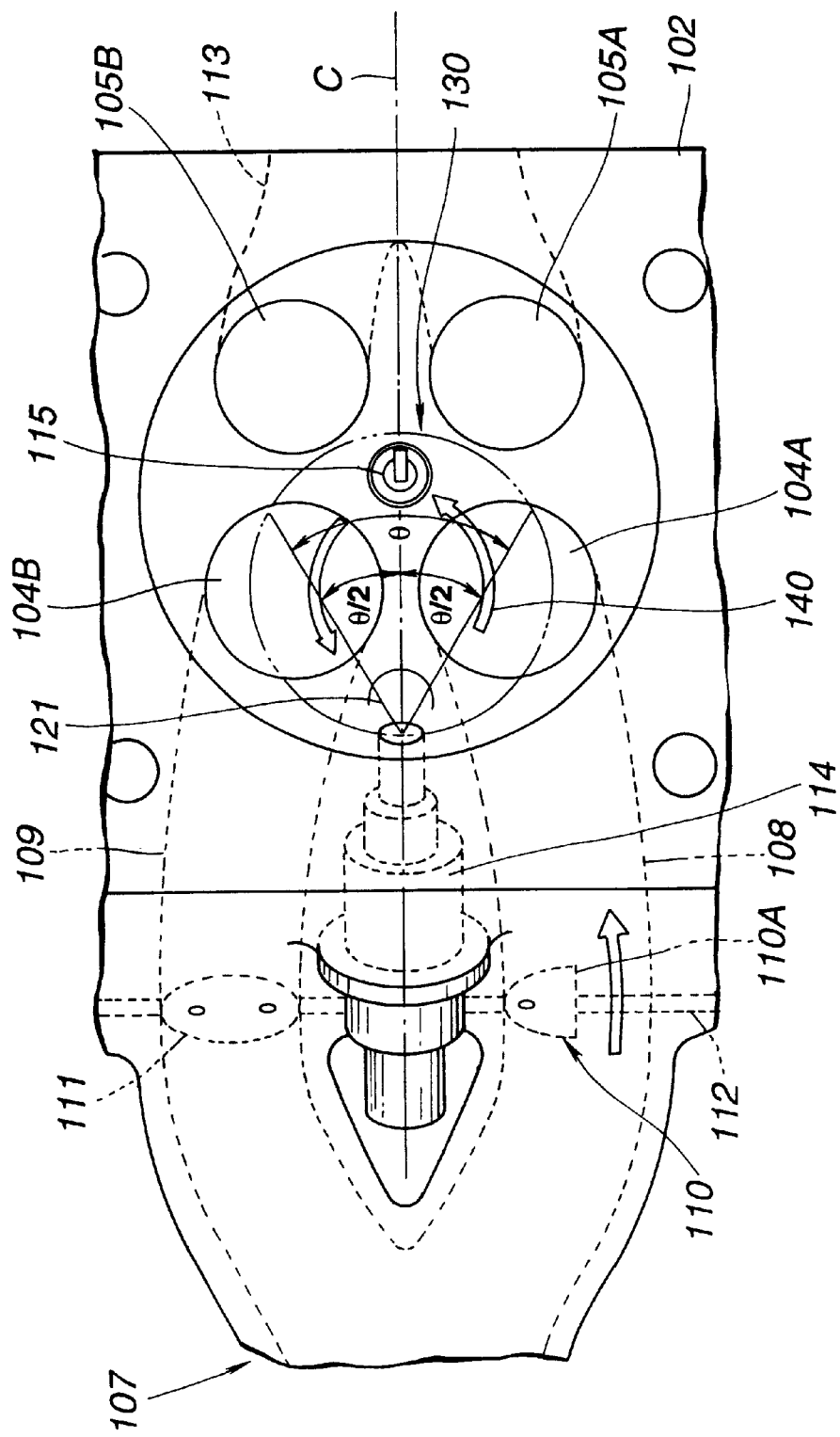
FIG. 26 is a view taken from along the line XXVI–XXVI of FIG. 25.
Figure 27:
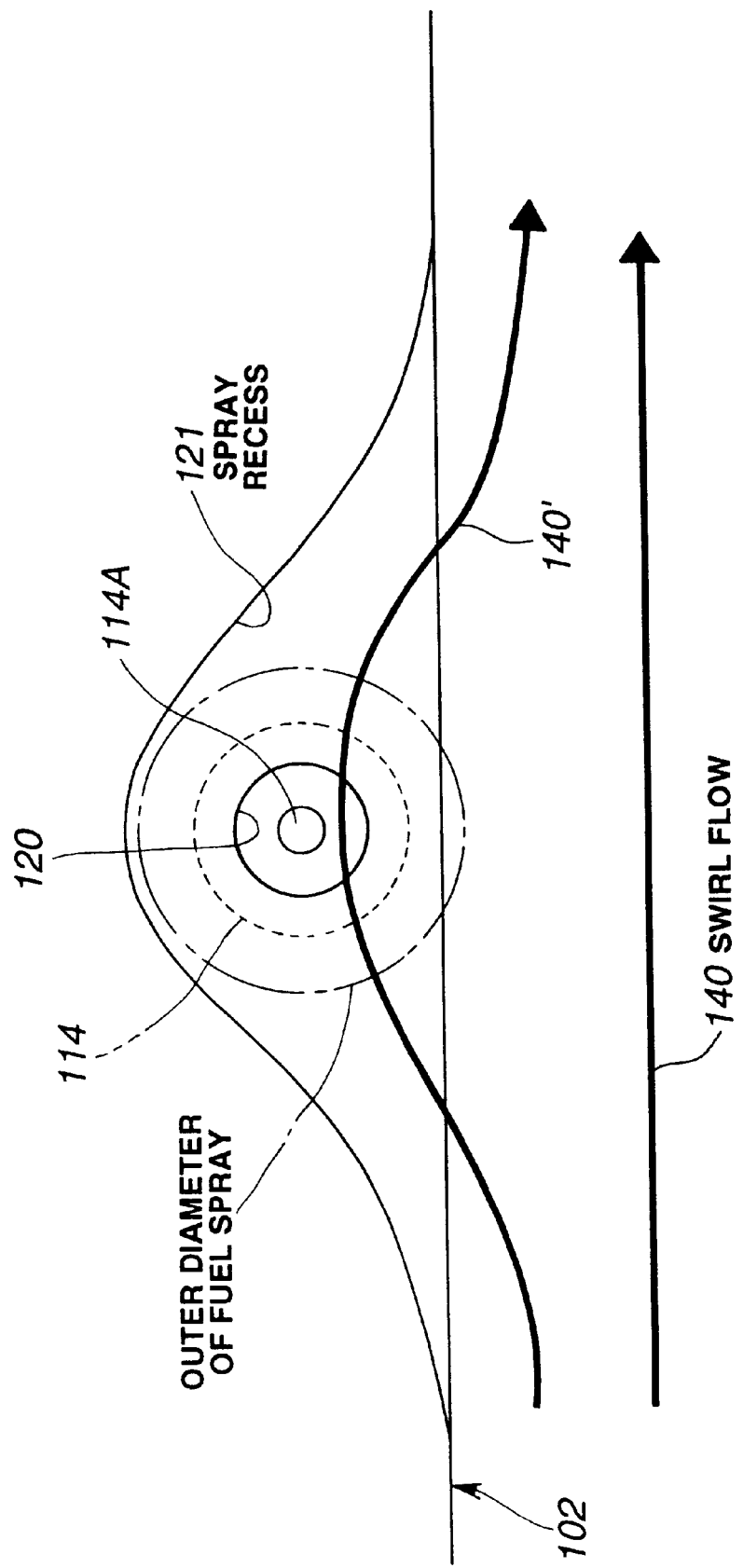
FIG. 27 is a front view of a spray recess.
Figure 28:
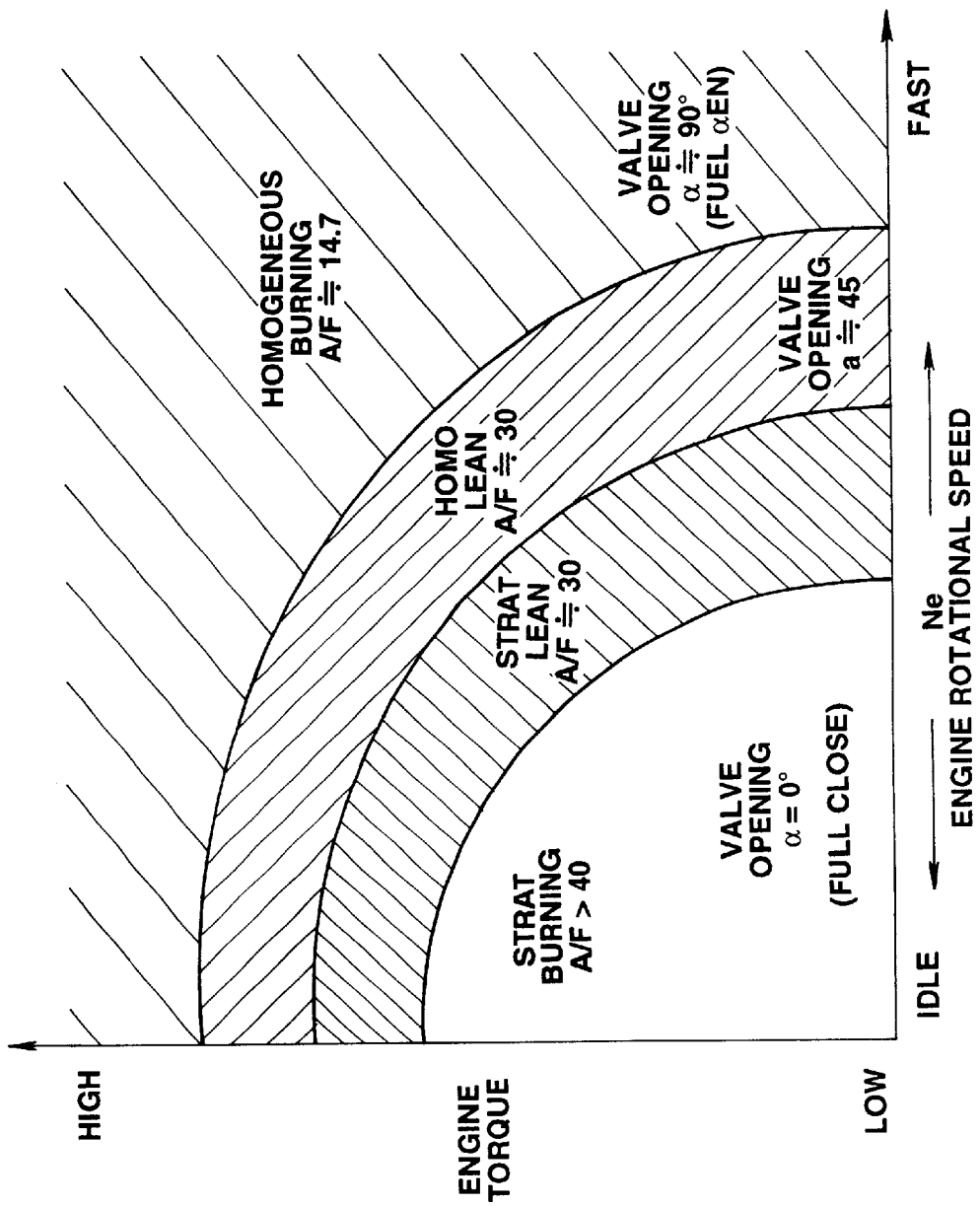
FIG. 28 is a graph showing the relationship between the burning condition and swirl control valve opening (depending on engine torque and engine rotational speed)

FIGS. 25 to 27 show a four-valve type spark ignition internal combustion engine having two intake valves, and two exhaust valves. A first intake port 108 and a second intake port 109 are independently branched from an intake manifold 107 and open to a pent roof-like combustion chamber 106 defined by a piston 103 and a cylinder head 102, and are opened and closed through intake valves 104A, 104B.

In the cylinder head 102, opposed to the first and second intake ports 108, 109 are exhaust ports 113, 113, which are opened and closed by exhaust valves 105A, 105B. In the center of the inner periphery of the cylinder head 102, surrounded by the intake valves 104A, 104B and the exhaust valves 105A, 105B, an ignition plug 115 is provided. The ignition plug 115 is arranged on the center line C of the cylinder 101.

The first and second intake ports 108, 109 independently branch from the intake manifold 107, and each is formed as a straight port. The first intake port 108 and the second intake port 109 are separated at a predetermined interval.

At an intermediate portion in the first intake port 108 and the second intake port 109, first and second swirl control valves 110, 111 are provided. These valves are connected through an opening and closing shaft 112, and are opened and closed in synchronization with each other by an actuator (not shown in the Figures).

The second swirl control valve 111 disposed on the second intake port 109 is closed to close the second intake port 109 as shown by a broken line in FIG. 25 when the valve is fully closed, that is, $_\alpha = 0°$, where as the second intake port 109 is capable of communicating the intake manifold 107 with the combustion chamber 106 when the valve 111 is fully opened, that is, $_\alpha = 90°$, as shown by reference numeral 111' in FIG. 25.

As shown in FIG. 26, a portion 110A is formed on the first swirl control valve 110 disposed in the first intake port 108, so as to throttle the passage sectional area while communicating the intake manifold 107 with the combustion chamber 106. In this embodiment, the first swirl control valve 110 is shaped like a semi-circle. Therefore, when the valve is fully closed, that is, $_\alpha = 0°$, the intake air passes therethrough over a predetermined passage sectional area between the portion 110A and the first intake port 108. In this embodiment, the portion 110A reduces the flow area of port 108 by about 50%, however this percentage can be varied. Providing flow at only the outermost portion of port 108 (the lower portion of 108 in FIG. 26) contributes to the generation of swirl.

the first intake port 108 is capable of communicating the intake manifold 107 with the combustion chamber 106 without throttling of the passage sectional area when the valve is fully opened, that is, $_\alpha = 90°$.

The opening and closing shaft 112 can be controlled to be locked at an arbitrary position between the fully open position and the fully close position of the first and second swirl control valves 110, 111 by the actuator.

A circular concave portion 130 having a predetermined depth is formed on the top surface 103A of the piston 103 opposed to the combustion chamber 106. Piston 103 is connected to a crankshaft through a piston pin 117 and a connecting rod 116. Portion 130 is just below the ignition plug 115 toward the intake valves 104A, 104B up to the periphery edge of the piston 103 and provides swirl flow at the inner periphery of the concave portion 130 to cause the swirl flow to be stratified and then led to the ignition plug 115, at the time of stratified burning.

As shown in FIG. 26, a fuel injection valve 114 is disposed along the center line C of the cylinder 101 between the first intake port 108 and the second intake port 109. An injection hole 114A side of the fuel injection valve 114 is inserted through an opening portion 120 formed on the cylinder head 102, and the injection hole 114A is arranged at a predetermined position so as to face the combustion chamber 106.

An axial line Jc of the fuel spray jetting through the injection hole 114A of the fuel injection valve 114 is coaxial with the axis of the injection valve 114, in this embodiment. In FIG. 25, the axial line Jc of the fuel spray is set so as to cross with substantially the center of the concave portion 130 formed on the piston top surface 103 A, and as shown in FIG. 26, the axial line Jc of the fuel spray is set so as to be coaxial with the center line C of the cylinder 101. Therefore, as shown in FIG. 25, the fuel injection valve 114 is supported on the cylinder head 102 while being inclined at a slight angle with respect to the first and second intake ports 108, 109.

A spray recess 121 is disposed on the cylinder had near the injection hole 114A in the fuel injection valve 114. The design of this recess will now be described.

The swirl flow 140 is generated in the combustion chamber 106, and stratification is realized by introducing the fuel spray into the swirl flow 140 at the time near stratified burning. It is desirable that the entire injection hole 114A be exposed to the combustion chamber 106. However, the outer periphery of the fuel spray should be prevented from contacting the cylinder head 102. When the upper portion of the injection hole 114A is embedded in the cylinder head 102, as shown in FIG. 25, a part 140' of the swirl flow 140 should be introduced to the injection hole 114A. Concave spray recess 121 provides for this (as shown in FIG. 27) and also prevents the fuel spray from being deposited.

Figure 31:
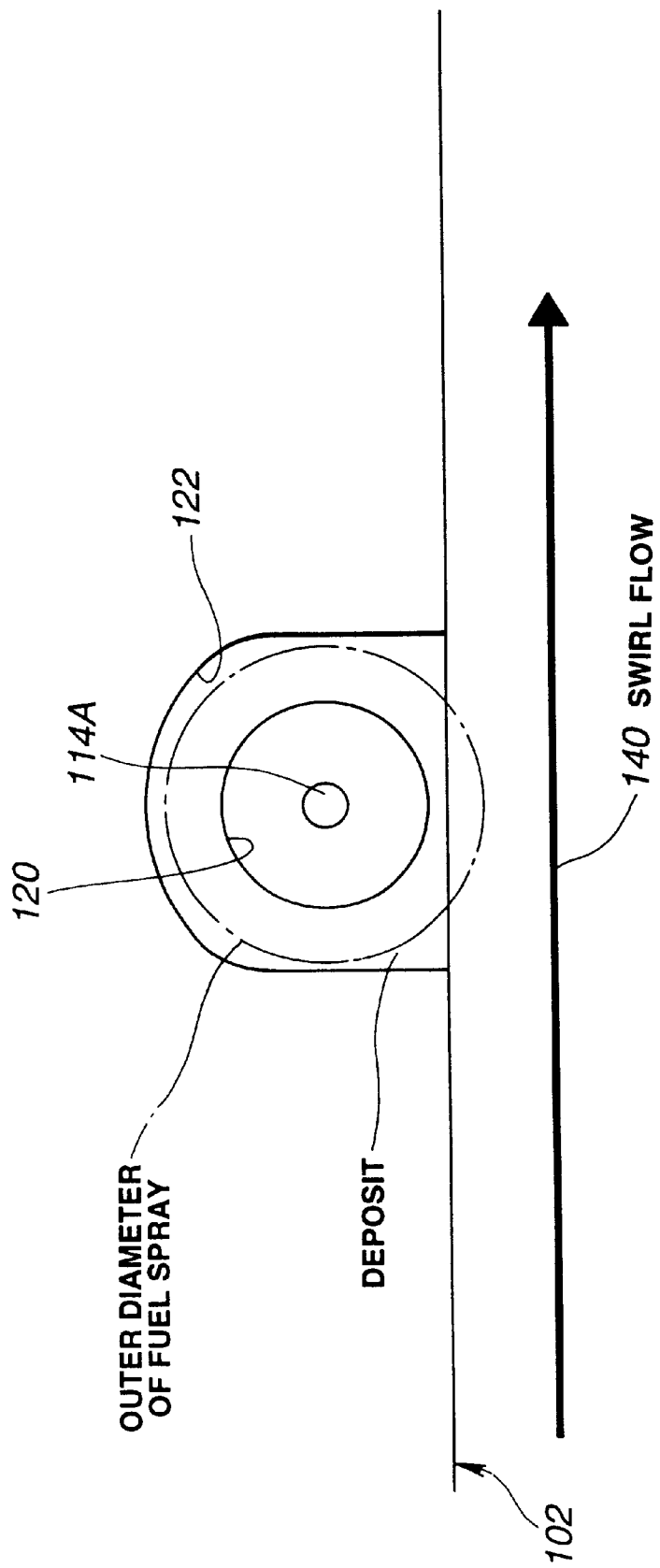
FIG. 31 is a front view of an opening portion, in which the fuel injection valve is contained, which is not provided with a spray recess.

As shown in FIG. 31, if a concave portion 122 is provided to prevent the fuel spray from being deposited on the cylinder head covering the upper part of the injection hole, a deposit, shown by hatching in FIG. 31, is unexpectedly deposited on an inner periphery of the portion 122, upstream of the swirl flow 140.

On the contrary, the curved shape of concave spray recess 121 prevents the outer periphery of the fuel spray from contacting the cylinder head and also guides a part 140' of the swirl flow 140 in the combustion chamber 106 to the vicinity of the injection hole 114A. This recess on the cylinder head 102 covering the upper part of the injection hole 114A prevents the deposit from occurring upstream of the swirl flow, which results in improvement of reliability and endurance and reduces the smoke generation amount and the HC discharge amount, improving emission performance.

The fuel injection valve 114 injects fuel in a cone-shaped manner having a predetermined angle between 50° to 80° and the pressure of the supplied fuel is set to a relatively low pressure of, for example, 5 MPa.

Operations of the above-described construction will now be described. These operations are summarized in FIGS. 28 and 29.

At the time of stratified burning in which fuel consumption is reduced, the opening and closing shaft 112 is driven to a position where the valve is fully closed, that is, $_\alpha$=0°, thereby causing the first and second swirl control valves 110, 111 to close.

When the valve opening is 0°, the second swirl control valve 111 fully closes the second intake port 109, while the first swirl control valve 110, having the portion 110A, throttles the passage sectional area of the first intake port 108, thereby allowing passage of the intake air between the portion 110A and the inner wall.

Thus, during the air intake stroke, air intake is carried out only through the first intake port 108 having the throttled passage sectional area, thereby causing (as shown by arrow 140 in FIG. 26) the swirl flow 140 in the anti-clockwise direction as viewed from the rear surface of the piston 103 to be generated in the combustion chamber 106, which causes the swirl flow 140 to be maintained in the concave portion 130 formed in the top surface 103A of the piston 103 during the subsequent compression stroke.

Then, at the time of stratified burning, fuel is injected from the fuel injection valve 114 toward the concave portion 130 in the state shown in FIG. 25 at the end of the compression stroke, thereby realizing ignition by means of ignition plug 115, arranged opposed to the concave portion 130, to realize super-lean burning in which the air-fuel ratio A/F is over 40.

On the other hand, at the time of homogeneous burning in which the engine torque is increased, the opening and closing shaft 112 is driven to a position where the valve opening is 90°, thereby causing the first and second swirl control valves 110, 111 to be opened.

When the valves are fully opened, the first and second swirl control valves 110, 111 fully open the first and second intake ports 108, 109, thereby allowing the intake air to pass through the two independent intake ports 108, 109.

Therefore, during the intake stroke, air is suctioned equally through the first and second intake ports 108, 109, thereby causing tumble flow to be generated in the combustion chamber 106. At the time of homogeneous burning, the fuel is injected from the fuel injection valve 114 during the intake stroke, thereby causing tumble flow in the combustion chamber 106 to cause the fuel spray (corresponding to an air-fuel ratio A/F near the stoichiometric air-fuel ratio) to be homogenized, which ensures good ignition by the ignition plug 115. Due to the air-fuel ratio A/F being near the stoichiometric air-fuel ratio, the engine torque is larger than during stratified burning. In particular, when the throttle is fully opened, an output equivalent to or more than a conventional MPI type internal combustion engine can be obtained.

During the intake stroke at the time of homogeneous burning, air is suctioned through the first and second intake ports 108, 109, comprising two straight ports, thereby enabling the engine output to be improved, compared with the case in which one of two independent intake ports is a helical port. This also eliminates the need for the addition of a complicated mechanism such as a variable valve timing system, like a conventional example. This makes the construction of a direct injection type spark ignition internal combustion engine simple and reduces production cost, and also provides both an output equivalent to a MPI type internal combustion engine and super-lean burning due to stratified burning in one engine.

In this embodiment, intermediate regions exist between stratified burning and homogeneous burning. A stratified lean burning condition has an air-fuel ratio (A/F=30) less than the above-mentioned stratified burning, and a homogeneous lean condition has an air-fuel ratio (A/F=20) more than the above-mentioned homogeneous burning. At the time of stratified lean burning or homogeneous lean burning, the opening of the first and second swirl control valves 110, 111 is set to an intermediate angle of about 45°.

Figure 29:
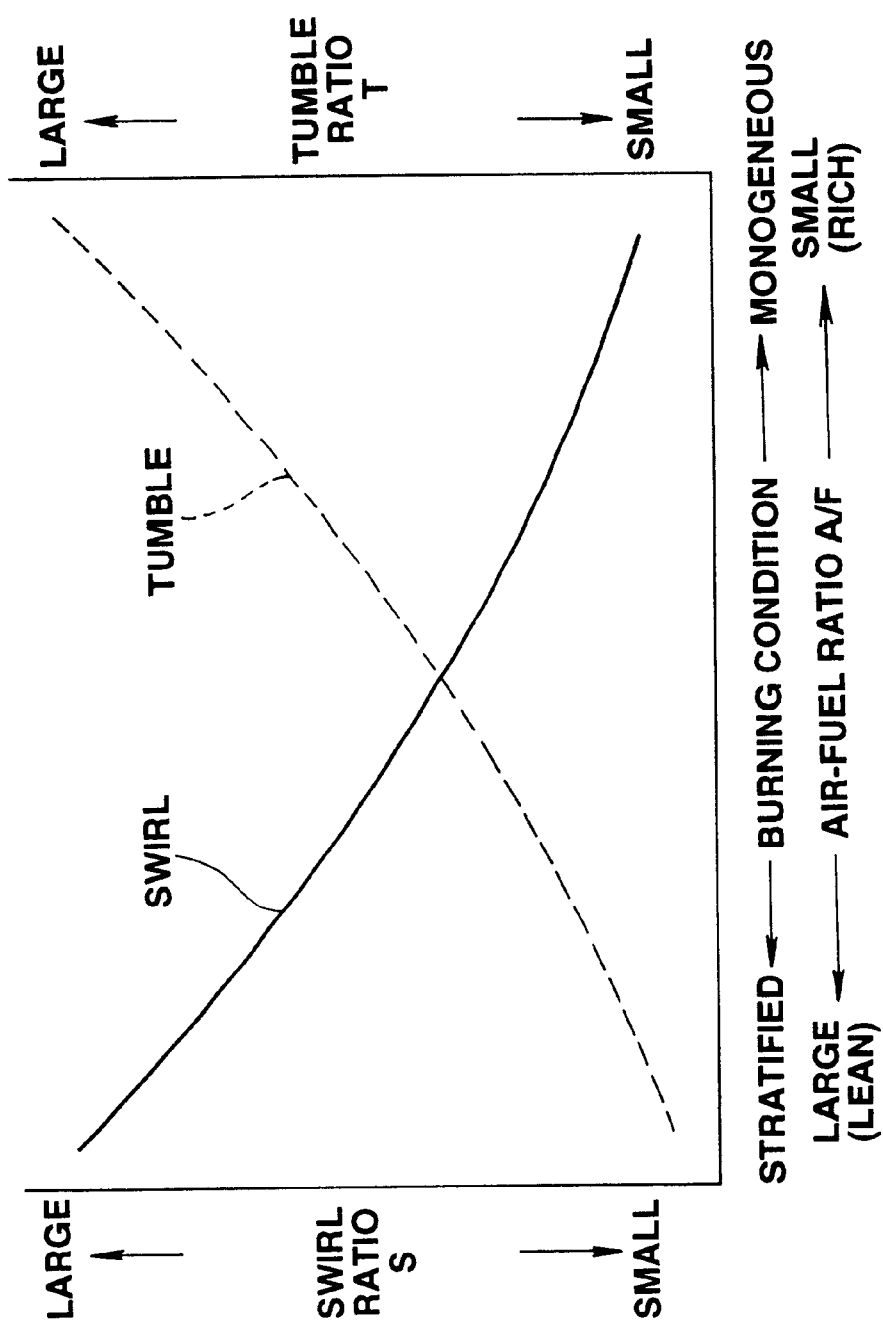
FIG. 29 is a graph showing how swirl and tumble are generated depending on the burning condition.

According to experiments, the relationship between air-fuel ratio A/F, or the burning condition, and the swirl ratio S and the tumble ratio T is shown in FIG. 29. As shown, at the time of stratified burning of the super-lean air-fuel ratio A/F, swirl flow is primarily generated to cause the stratification of the fuel spray to be accelerated. Therefore, it is desirable that the swirl ratio S be increased, where as the tumble ratio T be reduced. Accordingly, the first and second swirl control valves 110, 111 are closed, thereby causing strong swirl flow to be generated.

On the other hand, when the air-fuel ratio A/F is on the rich side near the stoichiometric air-fuel ration, generating primarily tumble flow enables the fuel spray injected during the intake stroke to be homogenized. Therefore, it is desirable that the tumble ratio be increased, whereas the swirl ratio S be reduced. Accordingly, the first and second swirl control valves 110, 111 are opened, thereby causing strong tumble flow to be generated by the two straight ports.

Since both tumble and swirl contribute to homogenization and stratification of the fuel spray in the intermediate regions of stratified burning and homogeneous burning, the opening of the first and second swirl control valves 110, 111 is set to an intermediate opening of about 45°, thereby causing both swirl flow and tumble flow to be generated. When the valve opening is about 45°, the air is suctioned at an intake air amount corresponding to the valve opening through the first and second intake ports 108, 109. Atmospheric air flows through the two intake ports 108, 109, thereby causing tumble flow to be generated in the combustion chamber 106. Also, intake air flow of the first intake port 108 on the side of the first swirl control valve 110, having the portion 110A, is larger than that of the second intake port 109 on the side of the second swirl control valve 111, thereby causing swirl to be generated in the combustion chamber based on the difference between the intake air flow amounts of the first and the second intake ports.

Also, in the homogeneous lean region, homogeneous burning of the air-fuel ratio of 20 is carried out with the first and second swirl control valves 110, 111 set to an intermediate angle, and in the stratified lean region stratified burning of an air-fuel ratio of 30 is carried out.

In the stratified lean burning region, after the first fuel injection is carried out during the intake stroke, a second fuel injection is carried out at the end of the compression stroke, as in the case with stratified burning, thereby providing stable lean burning in which the air-fuel ratio A/F is about 30. As a result, fuel is injected at the lean burning side air-fuel ratio during the intake stroke in the homogeneous burning region, which provides burning similar to the above-mentioned homogeneous burning.

When the burning condition switches from stratified burning to homogeneous burning, or vice versa, the burning condition is changed from stratified burning to homogeneous burning by changing-over the burning condition between stratified lean burning and homogeneous lean burning with the first and second swirl control vales 110, 111 set to an intermediate opening, thereby preventing excessive torque fluctuation (torque increase) when the burning condition is changed-over between stratified burning and homogeneous burning. This provides stable burning between super-lean burning and normal burning near the stoichiometric air-fuel ratio.

Each first and second swirl control valve 110, 111 is set to an intermediate angle of about 45° (which is varied depending on the operating condition): therefore, the openings of the first and second swirl control valves 110, 111 performing homogeneous lean burning and stratified lean burning are set to different values, respectively, at the time of transition from stratified burning to homogeneous burning, and at the time of transition from homogeneous burning to stratified burning. The openings of the first and second swirl control valves 110, 111 can be controlled continuously depending on the transition of the burning condition or the change of the air-fuel ratio A/F. Variably controlling the first and second swirl control valves 110, 111 disposed on independent first and second intake ports 108, 109 enables the ratio of the swirl and the tumble to be set to an optimum value corresponding to each of the burning conditions, thereby resulting in improvement of the output performance and the burning performance while reducing the smoke generation amount and the HC discharge amount, to provide improvements in emission characteristics.

Figure 30:
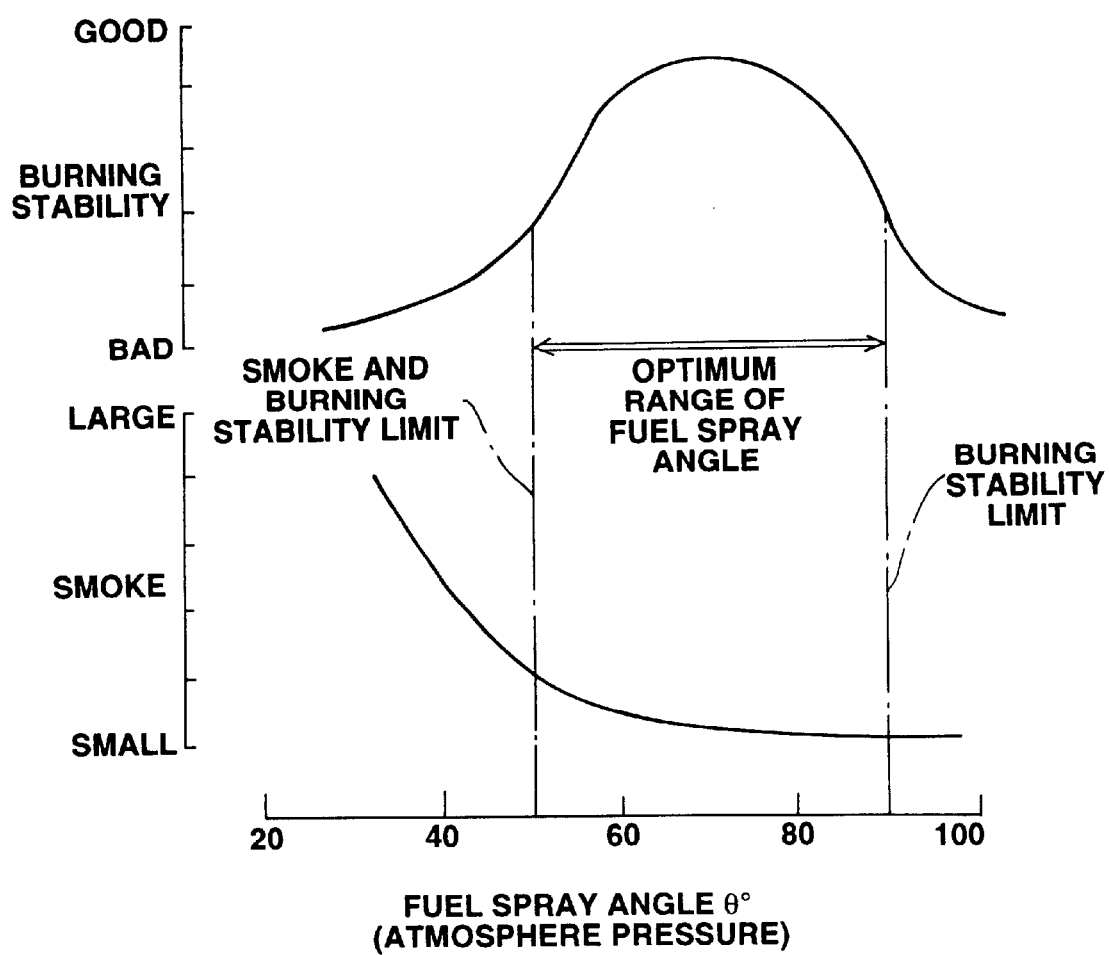
FIG. 30 is a graph showing the relationship between the fuel injection angle, burning stability, and smoke generating condition, in the case of atmospheric pressure.

FIG. 30 illustrates the relationship between the fuel injection angle of the fuel injection valve 114, and the burning stability and the smoke generation amount of this direct injection type internal combustion engine.

As described above, when the fuel is injected by the use of pressurized fuel of a relatively low pressure of about 5 MPa, the realize stable stratified burning by atomizing the fuel, experiments were conducted related to the relationship between the fuel injection angle and the burning stability (e.g., torque fluctuation amount) and the smoke generation amount, in the case of atmospheric pressure. The results are shown in FIG. 30.

When the fuel injection angle is less than about 50°, the amount of fuel deposited to the concave portion 130 formed on the piston top surface 103A is increased, thereby increasing the smoke generation amount. This also increases the air-fuel ratio A/F near the ignition plug 115 to unexpectedly deteriorate the burning stability.

On the other hand, when the fuel injection angle exceeds about 90, the smoke generation amount is lowered; however, the fuel spray flows out of the concave portion 130, thereby disabling smoothly stratified burning to unexpectedly deteriorate the burning stability again.

Therefore, setting the fuel injection angle of the fuel injection valve 114 to a value between 50° to 90° in the case of atmospheric pressure realizes burning stability while reducing the smoke generation amount at the time of stratified burning, which enables operability and emission performance together.

Seventh Embodiment

Figure 32:
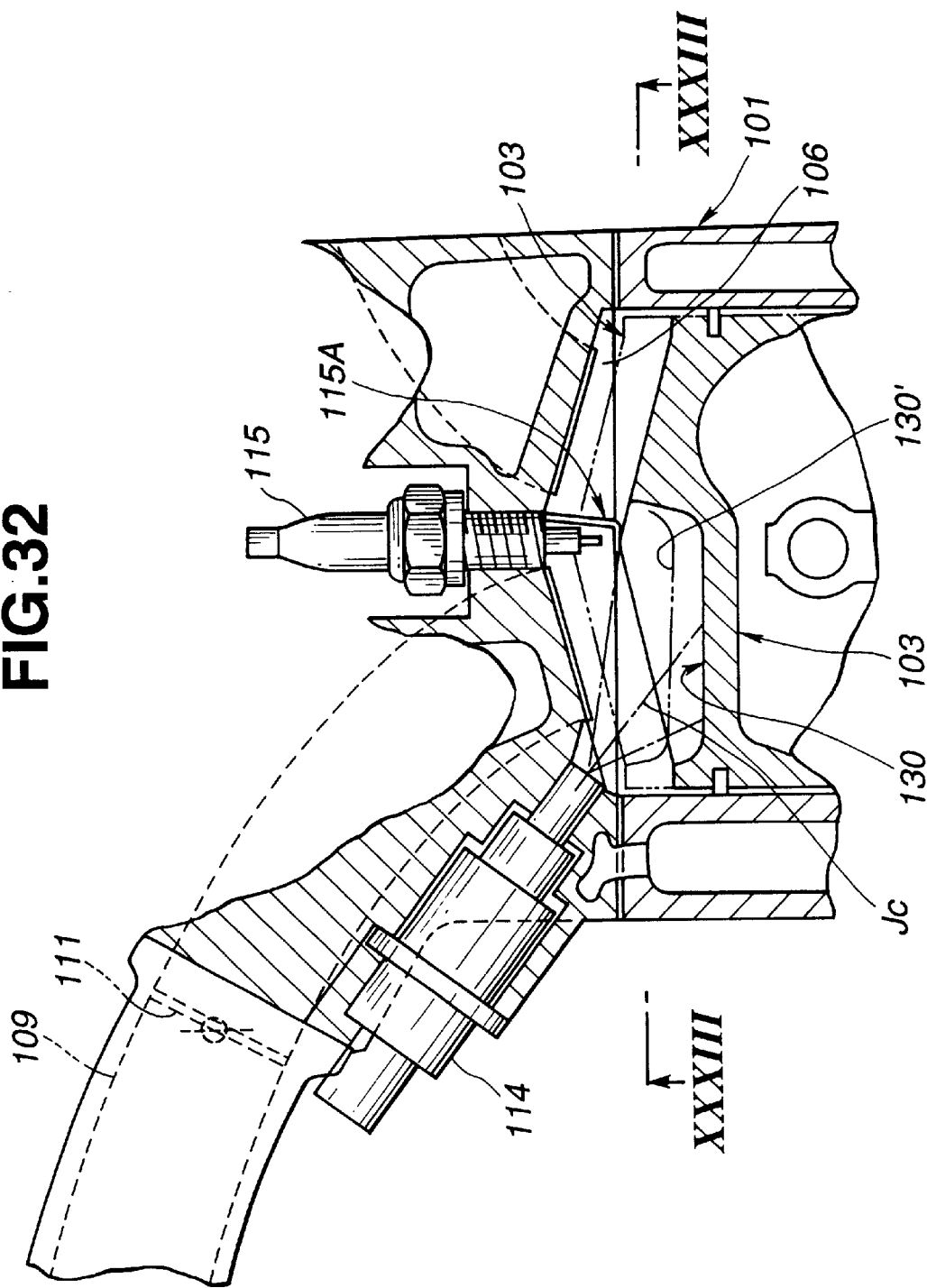
FIG. 32 is a vertical sectional view of a direct injection type internal combustion engine according to a seventh embodiment.
Figure 33:
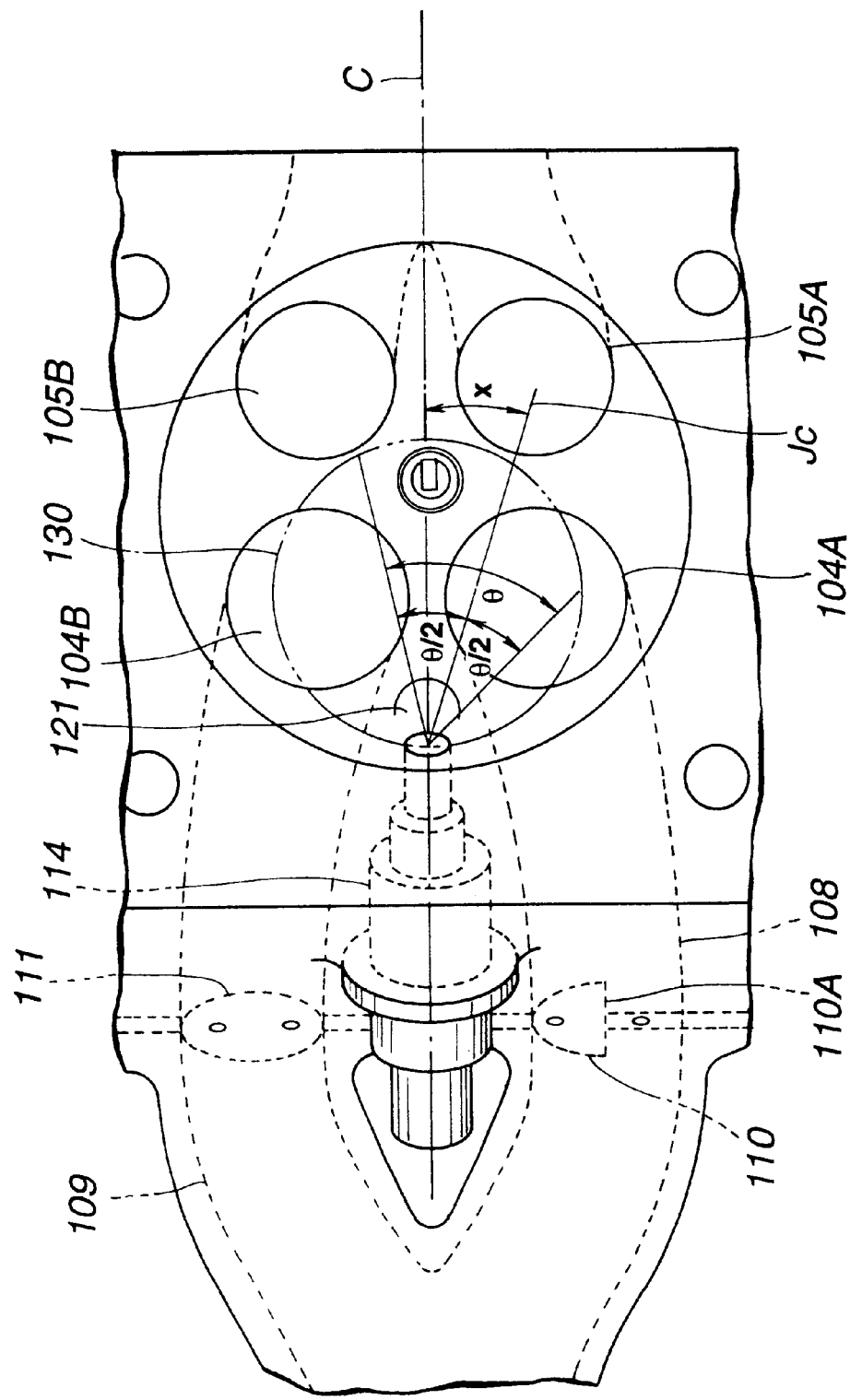
FIG. 33 is a view taken along the line XXXIII–XXXIII of FIG. 32.

FIGS. 32 to 35 illustrate a seventh embodiment and modifications thereof. In FIGS. 32 and 33, the axial line Jc of the fuel injection of the fuel injection valve 114 is deflected to the side of the first intake port 108 by a predetermined angle x with respect to the axial line C of the cylinder 101, and an electrode 115A of the ignition plug 115 is inserted into an inner periphery of the concave portion 130 formed on the piston top surface 103A in compression top dead center 103' of the piston 103. The other details are the same as those of previous embodiment(s).

When the piston 103 is at the compression top dead center 103', the electrode 115A of the ignition plug 115 is inserted into the inner periphery of the concave portion 130 of the piston top surface 103A, causing the ignition plug 115 to be inserted into the swirl flow generated due to the suction through the first intake port 108, at the time of stratified burning, which enables the stratified fuel spray to be ignited. This results in improvement of the stability of the super-lean burning due to stratified burning.

Deflecting the axial line Jc of the fuel spray of the fuel injection valve 114 to the side of the first intake port 108 enables the injected fuel to be stratified at a portion of the swirl upstream of the ignition plug 115, and reduces the fuel required to be directly injected to the ignition plug 115, which in turn reduces the fuel deposited on the ignition plug 115 and results in improvement in the cold start-ability of the internal combustion engine.

Figure 34:
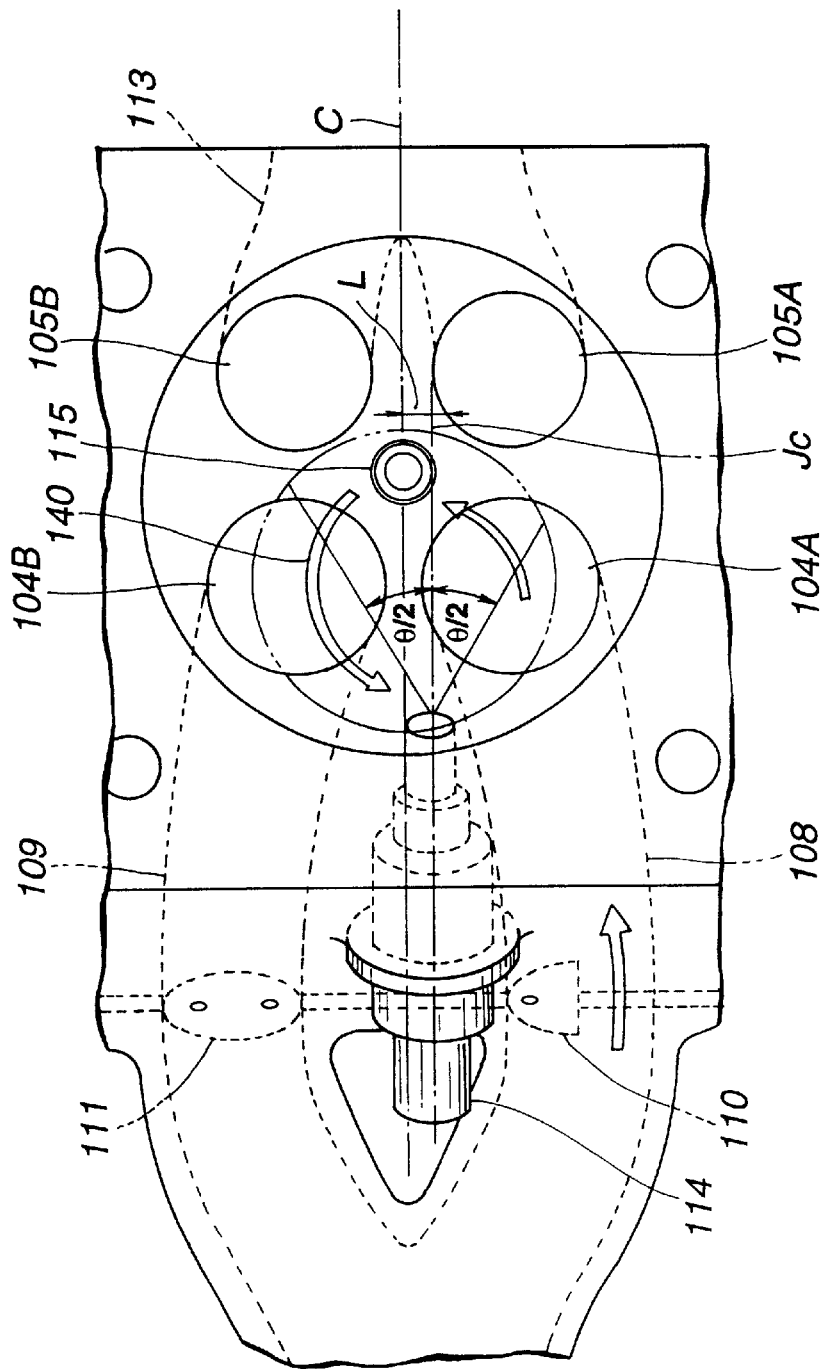
FIG. 34 shows a modification, viewing a cylinder head from the cylinder side.

In FIG. 34, the axial line Jc of the fuel injection of the fuel injection valve 114 is offset to the side of the first intake port 108 by a predetermined amount L with respect to the axial line C of the cylinder 101. Other details are the same as those of previous embodiments.

Offsetting the axial line Jc of the fuel spray of the fuel injection valve 114 to the side of the first intake port 108 reduces the fuel required to be directly injected to the ignition plug 115, and causes the fuel spray injected from the fuel injection valve 114 to be stratified at a portion of the swirl upstream of the ignition plug 115. This improves stability during stratified burning and reduces the fuel deposited on the ignition plug 115, which in turn results in improvement of cold start-ability of the internal combustion engine. The offset amount L is set to a predetermined value such that the injected fuel spray does not leak through the concave portion 130 of the piston 103.

Figure 35:
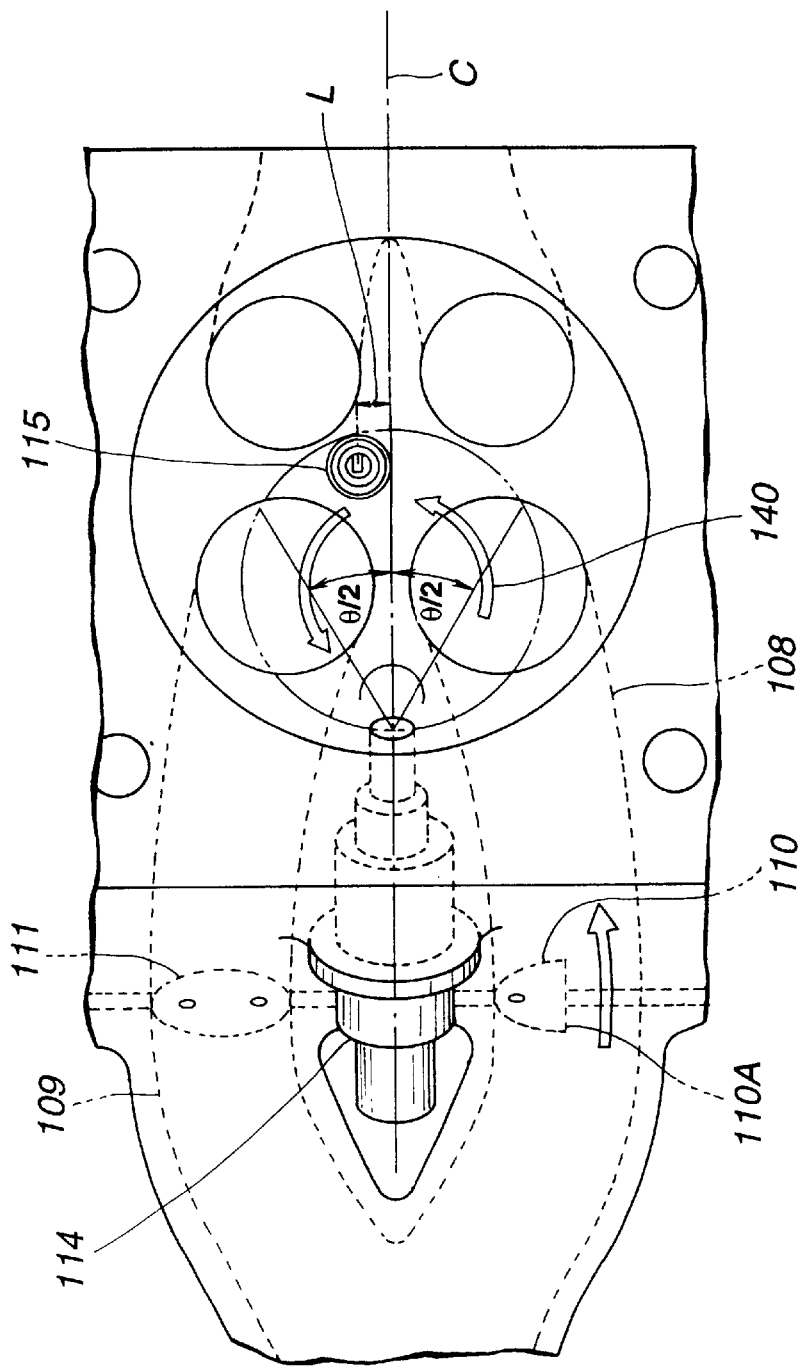
FIG. 35 shows a modification, viewing a cylinder head from the cylinder side.

In FIG. 35, the offset amount L is applied to the ignition plug 115, and thus the ignition plug 115 is offset to the side of the second intake port 109 by a predetermined amount L with respect to the axial line of the cylinder 101. The offset amount L is a predetermined value and is set such that the injection plug 115 can be opposed to the inner periphery of the concave portion 130.

Offsetting the ignition plug 115 to the side of the second intake port 109 reduces the fuel required to be directly injected to the ignition plug 115, and causes the fuel spray injected from the fuel injection valve 114 to be stratified at a portion of the swirl upstream of the ignition plug 115, and thus reduces the fuel deposited on the ignition plug 115, which in turn results in improvement of the cold start-ability of the internal combustion engine. This also improves stability during stratified burning.

The entire contents of Japanese Patent Applications P9-135269 (filed May 26, 1997), P9-137369 (filed May 28, 1997) P9-132673 (filed May 23, 1997). P9-129053 (filed May 20, 1997, and Press Information entitled "Nissan Direct-Injection Engine" (Document E1-2200-9709 of Nissan Motor Co., Ltd. of Tokyo, Japan) are incorporated herein by reference.

Although the invention has ben described above by reference to certain embodiments of the invention, the invention is not limited to the embodiments described above. Modifications and variations of the embodiments described above will occur to those skilled in the art, in light of the above teachings. For example, the cavity combustion chamber can be oval in shape, with a major axis along the thrust-antithrust direction of the piston. The scope of the invention is defined with reference to the following claims.

What is claimed is:

1. An internal combustion gasoline engine, comprising:
    a cylinder;
    a cylinder head at a head of the cylinder;
    a piston within the cylinder;
    a fuel injector to inject fuel in the form of gasoline directly into the cylinder;
    an air intake assembly to introduce air through the cylinder head into the cylinder to generate swirl flow for stratified charge combustion and to generate tumble flow for homogeneous charge combustion by controlling air flow into the cylinder; and
    an ignition plug, in the cylinder head, to ignite an air-fuel mixture in the cylinder;
    wherein the piston includes
        a first incline surface approximately parallel to an intake-side inclined surface of the cylinder head;
        a second inclined surface approximately parallel to an exhaust-side inclined surface of the cylinder head;
        side surfaces connected to the first and the second inclined surfaces; and
        a cavity combustion chamber recessed in the first inclined surface, the cavity combustion chamber having an increasing cross sectional area as the top of the piston is approached.

2. An engine as set forth in claim 1, wherein the air intake assembly includes two straight intake ports.

3. An engine as set forth in claim 2, wherein the two straight intake ports pass through the side of the cylinder head.

4. An engine as set forth in claim 1, wherein the first inclined surface, the second inclined surface, the side surfaces and the cavity combustion chamber are formed symmetrical with respect to a line which is perpendicular to a piston pin.

5. An engine as set forth in claim 1, wherein the cavity combustion chamber is recessed inside border liens of the first inclined surface and the side surfaces.

6. An engine as set forth in claim 1, wherein the piston further comprises:
    a horizontal surface formed on an outer region of the piston, the horizontal surface being perpendicular to the axis of the piston; and
    a step section located on a boarder of the horizontal surface and the second inclined surface.

7. An engine as set forth in claim 1, wherein the cavity combustion chamber is formed plate-shaped, with a substantially flat bottom and a side tapered expanding upward.

8. An engine as set forth in claim 1, wherein the piston further comprises a horizontal surface formed on the entire circumference of the piston.

9. An engine as set forth in claim 1, wherein the cavity combustion chamber is a substantially perfect circle in plan view.

10. An engine as set forth in claim 1, wherein the side surfaces have the shape of part of a cone.

11. An engine as set forth in claim 1, wherein the piston further comprises a bow-shaped squish area on the intake side.

12. An engine as set forth in claim 1, wherein the piston further comprises a bow-shaped squish area on the exhaust side.

13. An engine as set forth in claim 1, wherein at least one of the two straight intake ports has a swirl control valve.

14. An engine as set forth in claim 2, wherein both straight intake ports have swirl control valves.

15. An engine as set forth in claim 14, wherein one of the swirl control valves is notched to allow passage of air even when said one of the swirl control valves is shut.

16. An engine as set forth in claim 13, wherein the swirl control valves is shut for stratified charge combustion and opened for homogeneous charge combustion.

17. An engine as set forth in claim 2, wherein the intake ports are curved to the center of the cylinder in a view from a plane perpendicular to the piston axis.

18. An engine as set forth in claim 1, wherein the fuel injector directs fuel along an axis directed at the center of the cavity combustion chamber when the piston is near top dead center.

19. An engine as set forth in claim 1, wherein the piston further comprises a flat plane between top ends of the first and the second inclined surfaces, the flat plane perpendicular to the axis of the piston.

20. An engine as set forth in claim 1, wherein the cavity combustion chamber intersects with the second inclined surface.

21. An engine as set forth in claim 1, wherein the cavity combustion chamber does not intersect with the second inclined surface.

* * * * *